(12) United States Patent
Lee et al.

(10) Patent No.: US 12,471,158 B2
(45) Date of Patent: Nov. 11, 2025

(54) REMOTE CONTROLLER AND SYSTEM FOR CONTROLLING DISPLAY DEVICE

(71) Applicant: LG ELECTRONICS INC., Seoul (KR)

(72) Inventors: Hyeseung Lee, Seoul (KR); Sangjin Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 821 days.

(21) Appl. No.: 17/742,501

(22) Filed: May 12, 2022

(65) Prior Publication Data

US 2023/0292381 A1    Sep. 14, 2023

(30) Foreign Application Priority Data

Mar. 8, 2022  (KR) .................. 10-2022-0029244

(51) Int. Cl.
| | |
|---|---|
| *H04W 76/14* | (2018.01) |
| *H04W 12/50* | (2021.01) |
| *H04W 76/15* | (2018.01) |
| *H04B 10/114* | (2013.01) |
| *H04W 4/80* | (2018.01) |

(52) U.S. Cl.
CPC .......... *H04W 76/14* (2018.02); *H04W 12/50* (2021.01); *H04W 76/15* (2018.02); *H04B 10/1149* (2013.01); *H04W 4/80* (2018.02)

(58) Field of Classification Search
CPC .... G08C 2201/20; G08C 23/04; G08C 17/02; H04B 10/1149; H04N 21/42221; H04N 21/43615; H04N 21/43637; H04W 76/14; H04W 12/50; H04W 76/15; H04W 4/80
See application file for complete search history.

(56) References Cited

U.S. PATENT DOCUMENTS

| | | | |
|---|---|---|---|
| 2021/0282017 A1* | 9/2021 | Balarajashetty | ....... G08C 23/04 |
| 2022/0053578 A1* | 2/2022 | Schodet | .......... H04W 4/80 |

FOREIGN PATENT DOCUMENTS

| | | | | |
|---|---|---|---|---|
| CN | 103714277 A | * | 4/2014 | .......... G06F 21/445 |
| EP | 3 190 786 A2 | | 7/2017 | |
| KR | 10-2015-0028501 A | | 3/2015 | |
| KR | 10-2022-0023592 A | | 3/2022 | |

\* cited by examiner

*Primary Examiner* — Khoa Huynh
(74) *Attorney, Agent, or Firm* — Birch, Stewart, Kolasch & Birch, LLP

(57) ABSTRACT

A display device control system includes a first display device configured to include a first ultra-wideband (UWB) module and a first Bluetooth module, a second display device, and a remote controller configured to include an infrared (IR) module, a second UWB module, and a second Bluetooth module. The first display device and the remote controller are paired with each other. When the second display device includes a third UWB module and a third Bluetooth module, the third UWB module of the second display device senses the remote controller, the first display device and the remote controller are unpaired with each other, and the second display device and the remote controller are paired with each other.

16 Claims, 18 Drawing Sheets

REMOTE CONTROLLER AND SYSTEM FOR CONTROLLING DISPLAY DEVICE

This application claims the benefit of Korean Patent Application No. 10-2022-0029244, filed on Mar. 8, 2022, which is hereby incorporated by reference as if fully set forth herein.

BACKGROUND OF THE INVENTION

Field of the Invention

The present disclosure relates to a remote controller and system for controlling a plurality of display devices.

Discussion of the Related Art

With the increasing development of information society, the demand for display devices is also increasing in various forms. In response to this trend, various display devices, for example, Liquid Crystal Display (LCD), Field Emission Display (FED), Plasma Display Panel (PDP), an electroluminescent device, etc. have recently been developed.

A liquid crystal panel of the LCD may include a liquid crystal layer, may further include a thin film transistor (TFT) substrate and a color filter substrate that are arranged to face each other on the basis of the liquid crystal panel interposed therebetween, and may display an image using light provided from a backlight unit.

As an example of an electroluminescent device, active-matrix-type organic light emitting display (OLED) devices are commercially available on the market and widely used throughout the world. Since the OLED device is a self-emitting device, the OLED device has no backlight and is advantageous in terms of a response speed and a viewing angle as compared to the LCD, so that the OLED devices are attracting attention as next-generation displays.

Also, in recent years, it is common to have several display devices in a house. For example, a display device may be provided in each of a living room and a bedroom. In this case, there is a problem in that the remote controller for controlling the display device located in the living room and the remote controller for controlling the display device located in the room must be separately provided.

SUMMARY OF THE INVENTION

Accordingly, the present disclosure is directed to a remote controller and a system for controlling a display device that substantially obviate one or more problems due to limitations and disadvantages of the related art.

An object of the present disclosure is to provide a remote controller for controlling a plurality of display devices and a display device control system for allowing only one remote controller to control the plurality of display devices.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device control system may include a first display device configured to include a first ultra-wideband (UWB) module and a first Bluetooth module; a second display device; and a remote controller configured to include an infrared (IR) module, a second UWB module, and a second Bluetooth module. The first display device and the remote controller may be paired with each other. When the second display device includes a third UWB module and a third Bluetooth module, the third UWB module of the second display device may sense the remote controller, the first display device and the remote controller may be unpaired with each other, and the second display device and the remote controller may be paired with each other.

The remote controller may receive information of the second display device through the second UWB module. The information of the second display device may include network information of the second display device, Bluetooth support information of the second display device, and support information of the remote controller.

When the first UWB module of the first display device senses the remote controller, the second display device may block infrared (IR) reception. When the third UWB module of the second display device senses the remote controller, the first display device may block IR reception.

When the second display device includes the third UWB module and does not include the third Bluetooth module, the third UWB module of the second display device senses the remote controller; confirming whether the first display device and the second display device are connected to the same network is performed; and when the first display device and the second display device are connected to the same network, the remote controller controls the second display device through a control signal for the first display device.

The first display device may transmit a control signal received from the remote controller to the second display device.

When the first display device and the second display device are not connected to the same network, a guide window for connecting at least one of the first display device and the second display device to a network may be output.

When the second display device is not connected to a network, the first display device and the remote controller may be unpaired with each other. The second display device may be controlled using the IR module of the remote controller.

When the second display device does not include the third UWB module and the third Bluetooth module, confirming whether the first display device and the second display device are connected to the same network is performed. When the first display device and the second display device are connected to the same network, the remote controller may control the second display device through a control signal for the first display device.

When at least one of the first display device and the second display device is not connected to a network, the first display device and the remote controller are unpaired with each other. The second display device may be controlled using the IR module of the remote controller.

The remote controller may further include a near field communication (NFC) tag. When the second display device includes an NFC tag receiver, the NFC tag receiver of the second display device senses the remote controller, confirming whether the first display device and the second display device are connected to the same network is performed, and when the first display device and the second display device are connected to the same network, the remote controller controls the second display device through a control signal for the first display device.

When at least one of the first display device and the second display device is not connected to a network, the first display device and the remote controller are unpaired with each other. The second display device is controlled using the IR module of the remote controller.

In accordance with another embodiment of the present disclosure, a remote controller includes an infrared (IR) module, an ultra-wideband (UWB) module, a Bluetooth module, a near field communication (NFC) tag, and a controller. The controller may pair with a first display device, may perform unpairing with the first display device upon receiving information of a second display device from the second display device, wherein the information of the second display device includes network information and Bluetooth support information, and may pair with the second display device.

The controller may receive network information from the first display device, when the second display device does not provide a Bluetooth function. The controller may control the second display device through a control signal for the first display device, when the first display device and the second display device are connected to the same network.

The controller may perform unpairing with the first display device, when at least one of the first display device and the second display device is not connected to a network, and may control the second display device using the IR module.

The information of the second display device may be received through an NFC tag receiver of the second display device.

In accordance with another embodiment of the present disclosure, a method for controlling the remote controller includes performing pairing with the first display device; performing unpairing with the first display device upon receiving information of the second display device from the second display device; and performing pairing with the second display device, wherein information of the second display device includes network information and Bluetooth support information.

The method may further include receiving network information from the first display device when the second display device does not provide a Bluetooth function, and controlling the second display device through a control signal for the first display device when the first display device and the second display device are connected to the same network.

The method may further include performing unpairing with the first display device, when at least one of the first display device and the second display device is not connected to a network, and controlling the second display device using the IR module.

The method may further include receiving information of the second display device through an NFC tag receiver of the second display device.

It is to be understood that both the foregoing general description and the following detailed description of the present disclosure are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

Figure 1:
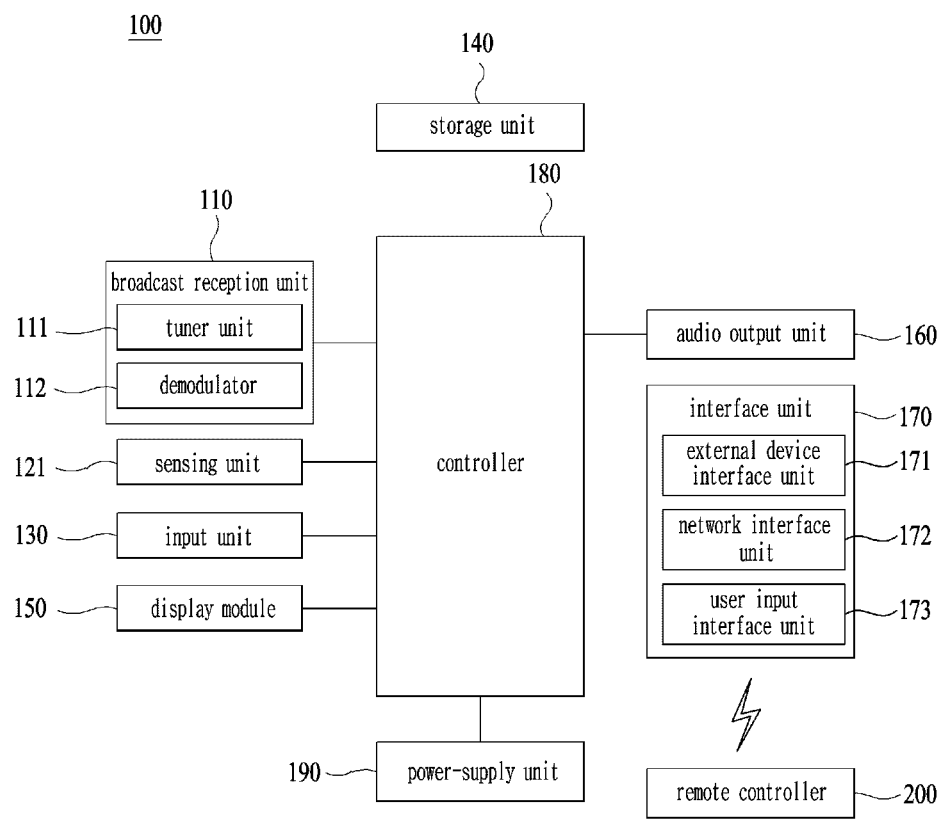
FIG. 1 is a block diagram illustrating constituent elements of a display device according to an embodiment of the present disclosure.

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

On the other hand, the image display device described herein is, for example, an intelligent image display device implemented by adding a computer support function to a broadcast reception function, and further includes an Internet function or the like while sufficiently performing the broadcast reception function, so that the image display device may have user-friendly interfaces such as a handwriting input device, a touchscreen, or a spatial remote controller. Further, the image display device can support a wired or wireless Internet function by connecting to the Internet and a computer device, thereby performing e-mailing, web browsing, banking, or gaming. To implement these functions, the image display device may operate based on a standard general-purpose Operating System (OS).

Accordingly, the image display device according to the present disclosure is designed in a manner that various applications can be easily added to or deleted from a general-purpose OS kernel so that the image display device can perform various user-friendly functions. The image display device may be, for example, a network TV, a Hybrid broadcast broadband TV (HBBTV), a smart TV, etc. The image display device is applicable to a smartphone as needed.

FIG. 1 is a block diagram illustrating constituent elements of a display device 100 according to an embodiment of the present disclosure.

Referring to FIG. 1, the display device 100 may include a broadcast reception unit 110, an external device interface unit 171, a network interface unit 172, a storage unit 140, a user input interface unit 173, an input unit 130, a controller 180, a display 150, an audio output unit 160, and/or a power-supply unit 190.

The broadcast reception unit 110 may include a tuner unit 111 and a demodulator 112.

Although not shown in the drawings, the display device 100 may include only the external device interface unit 171 and the network interface unit 172 from among the broadcast reception unit 110, the external device interface unit 171, and the network interface unit 172. That is, the display device 100 may not include the broadcast reception unit 110.

The tuner unit 111 may select a broadcast signal corresponding to either a user-selected channel or all prestored channels from among broadcast signals received through an antenna (not shown) or a cable (not shown). The tuner unit 111 may convert the selected broadcast signal into an intermediate frequency (IF) signal or a baseband image or a voice signal.

For example, when the selected broadcast signal is a digital broadcast signal, the tuner unit 111 may convert the selected broadcast signal into a digital IF (DIF) signal. When the selected broadcast signal is an analog broadcast signal, the tuner unit 111 may convert the selected broadcast signal into an analog baseband image or a voice signal (CVBS/SIF). That is, the tuner unit 111 may process the digital broadcast signal or the analog broadcast signal. The analog baseband image or the voice signal (CVBS/SIF) output from the tuner unit 111 may be directly input to the controller 180.

The tuner unit 111 may sequentially select broadcasting signals of all broadcasting channels stored through a channel memory function from among the received broadcast signals, and may convert the selected broadcast signal into an intermediate frequency (IF) signal or a baseband image or a voice signal.

The tuner unit 111 may include a plurality of tuners to receive broadcast signals of the plurality of channels. Alternatively, a single tuner for simultaneously receiving broadcast signals of the plurality of channels is also possible.

The demodulator 112 may receive the digital IF signal (DIF) converted by the tuner unit 111, and may thus perform demodulation of the received signal. The demodulator 112 may perform demodulation and channel decoding, and may output a stream signal (TS). The stream signal may be a signal formed by multiplexing an image signal, a voice signal, or a data signal.

The stream signal (TS) output from the demodulator 112 may be input tio the controller 180. The controller 180 may perform demultiplexing, image/audio signal processing, etc., may output an image through the display 150, and may output a voice through the audio output unit 160.

The sensing unit 120 may sense a change in the display device 100 or may sense an external change. For example, the sensing unit 120 may include a proximity sensor, an illumination sensor, a touch sensor, an infrared (IR) sensor, an ultrasonic sensor, an optical sensor (e.g., a camera), a voice sensor (e.g., a microphone), a battery gauge, environmental sensors (e.g., hygrometer, a thermometer, etc.).

The controller 180 may check a state of the display device 100 based on information collected by the sensing unit 120, may notify the user of a problem, or may control the display device 100 to be kept in the best state.

In addition, it is possible to provide an optimal viewing environment by differently controlling the content, image quality, size, etc. of the image provided to the display module 180 depending on the viewer, ambient illuminance, etc. sensed by the sensing unit. As the smart TV has evolved, the number of functions mounted in the display device increases, and the number of the sensing units 20 also increases together with the increasing functions.

The input unit 130 may be provided at one side of a main body of the display device 100. For example, the input unit 130 may include a touch pad, a physical button, and the like. The input unit 130 may receive various user commands related to the operation of the display device 100, and may transmit a control signal corresponding to the input command to the controller 180.

Recently, as a bezel of the display device 100 decreases in size, the number of display devices 100 each including a minimum number of input unit 130 formed in a physical button exposed to the outside is rapidly increasing. Instead, a minimum number of physical buttons may be provided on the back or side surface of the display device 100. The display device may receive a user input through the remote controller 200 through a touchpad or a user input interface unit 173 to be described later.

The storage unit 140 may store a program for processing and controlling each signal used in the controller 180, and may store a signal-processed image, a voice, or a data signal. For example, the storage unit 140 may store application programs designed for the purpose of performing various tasks that can be processed by the controller 180, and may selectively provide some of the stored application programs upon request of the controller 180.

The program stored in the storage unit 140 is not specifically limited to being executed by the controller 180. The storage unit 140 may perform a function for temporarily storing an image, a voice, or a data signal received from an external device through the external device interface unit 171. The storage unit 140 may store information about a predetermined broadcast channel through a channel memory function such as a channel map.

Although the storage unit 140 of FIG. 1 is provided separately from the controller 180, the scope of the present disclosure is not limited thereto, and the storage unit 140 may also be included in the controller 180 as needed.

The storage unit 140 may include at least one of a volatile memory (e.g., DRAM, SRAM, SDRAM, etc.) and a non-volatile memory (e.g., flash memory, hard disk drive (HDD), solid state drive (SSD), etc.).

The display 150 may generate a drive signal by converting an image signal, a data signal, an OSD signal, a control signal processed by the controller 180, or by converting an image signal, a data signal, a control signal, etc. received from the interface unit 171. The display 150 may include a display panel 181 having a plurality of pixels.

A plurality of pixels included in the display panel may include RGB sub-pixels. Alternatively, a plurality of pixels included in the display panel may include sub-pixels of RGBW. The display 150 may convert the image signal, the data signal, the OSD signal, the control signal, etc. processed by the controller 180 to generate a drive signal for the plurality of pixels.

The display 150 may be implemented as a plasma display panel (PDP), a liquid crystal display (LCD), an organic light emitting diode (OLED), a flexible display, etc. In addition, the display 150 may also be implemented as a three-dimensional (3D) display. The three-dimensional (3D) display 150 may be classified into a glassless-type 3D display and a glasses-type 3D display.

The display device may include a display module that occupies most parts of the front surface, and a case that covers the back and side surfaces of the display module and packages the display module.

Recently, the display device 100 has evolved from a flat-screen display to a curved-screen display. In order to implement the curved screen, the display device 100 may use a display module 150 that can be bent or curved, such as a light emitting diode (LED) or an organic light emitting diode (OLED), etc.

Conventionally, the LCD has difficulty in self-emitting light, so that the conventional LCD has been designed to receive light through a backlight unit. The backlight unit is a device for uniformly supplying light received from a light source to a liquid crystal located on the front surface of the display device. As the backlight becomes thinner, a thin LCD can be implemented. However, it is actually difficult for the backlight unit to be implemented as a curved structure formed of a flexible material. Although the backlight unit is implemented as a curved shape, it is difficult for light to be uniformly applied to the liquid crystal, thereby changing brightness of the screen.

On the other hand, the LED or the OLED is designed in a manner that each of constituent elements constructing the pixels can self-emit light without using the backlight unit, so that the LED or the OLED can be implemented as a curved shape without any problems. In addition, since each element can perform self-emission of light, brightness of each element is not affected by a change in the positional relationship between the element and adjacent elements, so that a curved display module 150 can be implemented as an LED or OLED.

OLED (Organic Light Emitting Diode) panels appeared in earnest in mid-2010 and are rapidly replacing LCDs in the small- and medium-sized display market. The OLED is a display made using the self-emission characteristics in which OLED emits light when a current flows in a fluorescent organic compound. Since the response speed of the OLED is faster than that of the LCD, there is little afterimage when moving images are implemented.

OLEDs may be used as a light-emitting display product. In this case, the light-emitting display device may use three fluorescent organic compounds (such as red, green, and blue) each having a self-emitting function, and may use the self-emitting phenomenon in which positive (+)-charged particles and electrons injected from a cathode and anode are combined with each other within the organic material, so that a backlight unit causing degradation of color sense need not be used.

The LED panel is implemented by technology for using only one LED element as one pixel, and has a smaller LED element compared to the prior art, so that a curved display module 150 can be implemented. Whereas the conventional device referred to as an LED TV can use the LED as a light source of the backlight unit for supplying light to the LCD, it is impossible for the LED of the conventional device to constitute a screen.

The display module may include a display panel, a coupling magnet located on the rear surface of the display panel, a first power-supply unit, and a first signal module. The display panel may include a plurality of pixels (R, G, B). The plurality of pixels (R, G, B) may be formed in each region where a plurality of data lines and a plurality of gate lines cross each other. The plurality of pixels (R, G, B) may be arranged in a matrix.

For example, the plurality of pixels (R, G, B) may include a red (R) sub-pixel, a green (G) sub-pixel, and a blue (B) sub-pixel. The plurality of pixels (R, G, B) may further include white (W) sub-pixel(s).

In the display module 150, one side where an image is displayed may be referred to as a front side or a front surface. When the display module 150 displays an image, one side where no image is observed may be referred to as a rear side or a rear surface.

Meanwhile, the display 150 may be implemented as a touchscreen, so that the display 150 can also be used as an input device in addition to an output device.

The audio output unit 160 may receive a voice-processed signal from the controller 180, and may output the received signal as a voice signal.

The interface unit 170 may serve as a path of connection to various kinds of external devices connected to the display device 100. The interface unit may include not only a wired method for transmitting/receiving data through a cable, but also a wireless method using the antenna.

The interface unit 170 may include at least one of a wired/wireless headset port, an external charger port, a wired/wireless data port, a memory card port, a port connected to a device having an identification module, an audio input/output (I/O) port, a video I/O port, and an earphone port.

As an example of a wireless method, the above-described broadcast reception unit 110 may be used. The broadcast reception unit 110 may be configured to use a broadcast signal, a mobile communication short-range communication signal, a wireless Internet signal, and the like.

The external device interface unit 171 may transmit or receive data to and from a connected external device. To this end, the external device interface unit 171 may include an A/V input/output (I/O) unit (not shown).

The external device interface unit 171 may be wired or wirelessly connected to an external device such as a digital versatile disc (DVD) player, a Blu-ray player, a game console, a camera, a camcorder, a computer (laptop), a set-top box, or the like, and may perform an input/output (I/O) operation with the external device.

In addition, the external device interface unit 171 may establish a communication network with various remote controllers 200, may receive a control signal related to operation of the display device 100 from the remote controller 200, or may transmit data related to operation of the display device 100 to the remote controller 200.

The external device interface unit 171 may include a wireless communication unit (not shown) for short-range wireless communication with other electronic devices. Through the wireless communication unit (not shown), the external device interface unit 171 may exchange data with an adjacent mobile terminal. In particular, the external device interface unit 171 may receive device information, application information, an application image, and the like from the mobile terminal in a mirroring mode.

The network interface unit 172 may provide an interface for connecting the display device 100 to a wired/wireless network including the Internet network. For example, the network interface unit 172 may receive content or data provided by the Internet, a content provider, or a network administrator through a network. The network interface unit 172 may include a communication module (not shown) for connection with the wired/wireless network.

The external device interface unit 171 and/or the network interface unit 172 may include a communication module for short-range communication such as Wi-Fi, Bluetooth, Bluetooth low energy (BLE), ZigBee, Near Field Communication (NFC), and a communication module for cellular communication such as Long-Term Evolution (LTE), LTE-A (LTE Advanced), Code Division Multiple Access (CDMA), WCDMA (wideband CDMA), UMTS (universal mobile telecommunications system), WiBro (Wireless Broadband), etc.

The user input interface unit 173 may transmit user input signals to the controller 180, or may transmit signals received from the controller 180 to the user. For example, the user input interface unit 173 may transmit or receive user input signals (such as a power-on/off signal, a channel selection signal, and a screen setting signal) to and from the remote controller 200, may transmit user input signals received through a local key (not shown) such as a power key, a channel key, a volume key, and a setting key to the controller 180, may transmit a user input signal received by a sensor unit (not shown) for sensing a user gesture to the controller 180, or may transmit a signal received from the controller 180 to the sensor unit.

The controller 180 may include at least one processor, and may control the overall operation of the display device 100 using the processor included therein. Here, the processor may be a general processor such as a CPU. Of course, the processor may be a dedicated device such as an ASIC, or other hardware-based processor.

The controller 180 may demultiplex the stream received through the tuner unit 111, the demodulator 112, the external device interface unit 171, or the network interface 172, and may process the demultiplexed signals to generate and output a signal for image or voice output.

The image signal processed by the controller 180 may be input to the display 150 and displayed as an image corresponding to the corresponding image signal. In addition, the image signal processed by the controller 180 may be input to the external output device through the external device interface unit 171.

The voice (or audio) signal processed by the controller 180 may be audibly output to the audio output unit 160. In addition, the voice signal processed by the controller 180 may be input to the external output device through the external device interface unit 171.

In addition, the controller 180 may control the overall operation of the display device 100. For example, the controller 180 may control the tuner unit 111 to select a broadcast program corresponding to either a user-selected channel or a prestored channel.

In addition, the controller 180 may control the display device 100 by a user command or an internal program received through the user input interface unit 173. The controller 180 may control the display 150 to display an image. In this case, the image displayed on the display 150 may be a still image or a moving image, and may be a 2D image or a 3D image.

On the other hand, the controller 180 may display a predetermined 2D object in the image displayed on the display 150. For example, the object may be at least one of a connected web screen (newspaper, magazine, etc.), electronic program guide (EPG), various menus, widgets, icons, still images, moving images, and text.

Meanwhile, the controller 180 may modulate and/or demodulate the signal using an amplitude shift keying (ASK) scheme. Here, the ASK scheme may refer to a method for modulating a signal by differentiating the amplitude of a carrier wave according to data values or for restoring an analog signal to a digital data value according to the amplitude of the carrier wave.

For example, the controller 180 may modulate an image signal using the ASK scheme, and may transmit the modulated signal through a wireless communication module.

For example, the controller 180 may demodulate and process the image signal received through the wireless communication module using the ASK scheme.

Accordingly, the display device 100 may simply transmit and receive signals to and from other image display devices arranged adjacent to each other without using either a unique identifier such as a Media Access Control (MAC) address or a complex communication protocol such as TCP/IP.

On the other hand, the display device 100 may further include a photographing unit (not shown). The photographing unit may photograph a user. The photographing unit may be implemented as one camera, but is not limited thereto, and may be implemented by a plurality of cameras. On the other hand, the photographing unit may be embedded in the display device 100 or may be separately arranged on the display 150. The image information photographed by the photographing unit may be input to the controller 180.

The controller 180 may recognize the position of the user based on the image photographed by the photographing unit. For example, the controller 180 may recognize a distance (z-axis coordinates) between the user and the display device 100. In addition, the controller 180 may recognize the X-axis coordinate and the Y-axis coordinate within the display 150 corresponding to the user position.

The controller 180 may sense a user gesture based on an image photographed by the photographing unit, each of signals detected by the sensor unit, or a combination thereof.

The power-supply unit 190 may supply corresponding power to the display device 100. In particular, the controller 180 may be implemented as a System on Chip (SoC), a display 150 for displaying an image, and an audio output unit 160 for audio output.

Specifically, the power-supply unit 190 may include a converter (not shown) for converting AC power into DC power, and a DC/DC converter (not shown) for converting the level of DC power.

On the other hand, the power-supply unit 190 may receive power from the external power source, and may distribute the received power to the respective components. The power-supply unit 190 may be directly connected to the external power source to supply AC power, and may include a battery capable of being charged with electricity.

In the former case, the power-supply unit 190 may be used by connecting to a wired cable, and it is difficult for the power-supply unit 190 to move from one place to another place, and the movement range of the power-supply unit 190 is limited. In the latter case, the power-supply unit 190 can move from one place to another place, but the weight and volume of the power-supply unit 190 may increase as much as the weight and volume of the battery. In addition, for charging, the power-supply unit 190 should be directly connected to a power cable for a predetermined period of time or should be coupled to a charging cradle (not shown) for power supply.

The charging cradle may be connected to the display device through a terminal exposed to the outside. Alternatively, if the power-supply unit 190 approaches the charging cradle using a wireless interface, a built-in battery of the power-supply unit 190 may also be charged with electricity.

The remote controller 200 may transmit a user input to the user input interface unit 173. To this end, the remote controller 200 may use Bluetooth, Radio Frequency (RF) communication, infrared (IR) communication, Ultra-Wideband (UWB), ZigBee, or the like. In addition, the remote controller 200 may receive the image, voice, or data signal output from the user input interface unit 173, and may display or audibly output the received image, voice, or data signal.

On the other hand, the above-described display device 100 may be a fixed or mobile digital broadcast receiver capable of receiving digital broadcast signals.

Meanwhile, the block diagram of the display device 100 shown in FIG. 1 is disclosed for only for illustrative purposes for one embodiment of the present disclosure, and the respective components of the display device 100 shown in FIG. 1 can be integrated, added or omitted according to the specifications of the digital device 100 which is actually implemented.

That is, if necessary, two or more components may be combined into one component, or one component may be subdivided into two or more components. In addition, the functions performed in each block are intended to explain the embodiment of the present disclosure, and the specific operation or device does not limit the scope of the present disclosure.

Embodiments to be described below will describe an exemplary case in which two or more display devices can be controlled by the remote controller. As the number of users who have several TVs (different models) in one home increases, it is necessary to control each of the TVs located in different spaces using only one remote controller.

To this end, according to one embodiment of the present disclosure, Bluetooth technology, near field communication (NFC) technology, and UWB (ultra-wideband) wireless technology can be applied to the embodiments of the present disclosure. Here, the Bluetooth technology and the NFC technology are technologies for short-range wireless communication, and are used by a remote controller capable of transmitting and receiving control signals to and from display device(s). In addition, the NFC technology can also be used as a handover technology for controlling the remote controller. UWB technology is short-range wireless communication technology for transmitting a large amount of information with low power over a wider frequency band compared to the existing frequency band, so that the UWB technology can precisely detect the position of the remote controller. In addition, although Bluetooth technology, NFC technology, and UWB technology are not described in detail herein for convenience of description, they are well-known to those skilled in the art and can also be applied to the embodiments without departing from the scope or spirit of the present disclosure.

Figure 2:
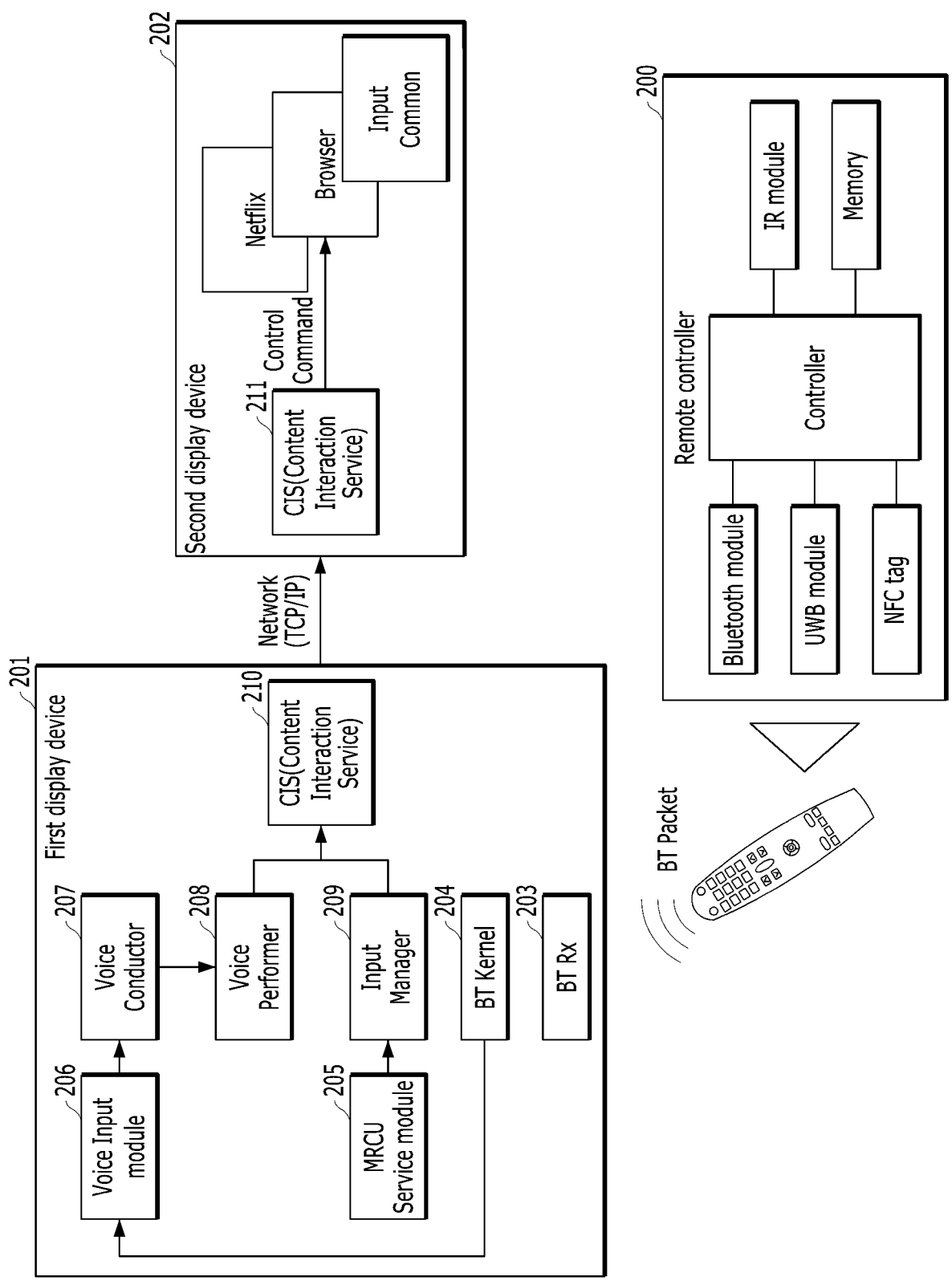
FIG. 2 is a block diagram illustrating a system for controlling display devices according to an embodiment of the present disclosure.

FIG. 2 is a block diagram illustrating a system for controlling display devices according to an embodiment of the present disclosure. Hereinafter, descriptions overlapping with the above description will herein be omitted for brevity.

Operations of a remote controller 200, a first display device 201, and a second display device 202 included in a display device control system according to an embodiment of the present disclosure will hereinafter be described with reference to FIG. 2. In this case, the first display device 201 may correspond to a display device to which a UWB function and a Bluetooth function are applied, and the second display device 202 may correspond to a display device to which only the UWB function is applied. Different functions can be applied to the first display device 201 and the second display device 202, and such functions to be applied differently to the first and second display devices 201 and 202 may vary according to embodiments to be described later.

The remote controller 200 may include an NFC tag, a UWB module, a Bluetooth module, an infrared (IR) module, a memory, a controller, and the like. However, it is also possible to add or delete some modules according to the needs of those skilled in the art.

Here, the NFC tag may correspond to a tag for performing NFC technology. NFC technology may perform NFC using a short-range tagging method. The NFC technology serving as one of wireless tag technologies may refer to contactless communication technology that uses a frequency band of 13.56 MHZ. Since NFC technology has a short communication distance, NFC technology has a relatively superior security and lower price, so that NFC technology is next-generation short-range communication technology that is attracting attention these days. In more detail, NFC technology can use both a data reading function and a data writing function, and need not perform setting between devices (e.g., device-to-device connection as in Bluetooth)

whereas it is similar to legacy short-range communication technology such as Bluetooth.

The UWB module may refer to wireless communication technology that can transmit and receive data by wirelessly connecting to a PC, peripheral devices, and home appliances in a limited space such as an office or home. The UWB module may perform data communication using short pulses due to characteristics thereof, and may transmit and receive information at an ultra-high speed of hundreds of Mbps within a short range of 10 meters or less using a very low power density and a wide frequency band of around 500 MHz.

In addition, the Bluetooth module may perform pairing between the remote controller and the display device, so that the Bluetooth module can perform data communication between the remote controller and the display device. Bluetooth is one of short-range wireless communication standards, and refers to a technical standard for wirelessly connecting/controlling various electronic and information communication devices within the radius of 10 to 100 meters using the 2.45 GHz frequency. Bluetooth may have advantages in that data can be transmitted and received at a high speed using radio frequencies without a physical cable for communication between various digital home appliances as well as various information communication devices (such as a computer, a printer, a mobile phone, a PDA, etc.) within a home or office. In addition, it may be assumed that the operation for performing pairing, which will be described later, is performed through the Bluetooth module.

In addition, the IR module may transmit an IR signal to the display device, and the memory may store network information and Bluetooth information of the display device after the remote controller receives the network information and the Bluetooth information of the display device through NFC.

Finally, the controller may transmit and receive information and control signals to and from the first display device and the second display device, and a detailed description thereof will be described later in more detail with reference to FIGS. 3 to 18.

In addition, it may be assumed that the first display device 201 and the second display device 202 can communicate with each other through a network.

In one embodiment, when the remote controller 200 transmits a Bluetooth signal to the display device 201, a Bluetooth receiver 203 of the first display device 201 can transmit various signals of the remote controller 200 to the respective modules through a Bluetooth kernel 204.

In more detail, control signals for a button input signal and a cursor input signal received from the remote controller 200 can be transmitted to an input manager 209 through an MRCU service module 205. Here, the MRCU is referred to as a magic motion remote controller or a magic remote controller, and refers to the remote controller 200 that recognizes a necessary operation through a cursor or wheel motion in the same manner as in a PC mouse. In particular, the remote controller 200 may recognize voice signals, and may implement recognition functions such as Amazon Alexa, Google Assistant, LG ThinQ, and the like. In addition, according to voice recognition through the remote controller 200, a user may speak (or verbally input) a control command to a microphone of the remote controller 200 while pressing the voice button of the remote controller 200, so that the control command verbally input to the microphone can be transferred to a content interaction service (CIS) 210 through a voice conductor 207 and a voice performer 208. In one embodiment, the voice performance 208 may convert the voice signal received from the remote controller 200 into a control signal for the display device.

In addition, the voice signal received from the remote controller 200 may be transmitted to the voice conductor 207 through the voice input module 206.

As described above, the control signals received from the remote controller 200 may be transmitted to the CIS 210 through the voice performer 208 and the input manager 209 of the first display device 201.

In one embodiment, the CIS 210 of the first display device 201 may transmit the control signal of the remote controller 200 to the CIS 211 of the second display device 202 through the network. The second display device 202 having received the control signal may perform an operation corresponding to the received control signal based on the CIS 210.

Accordingly, the remote controller 200 may transmit a control signal to the first display device 201, and the first display device 201 may determine and analyze the control signal of the remote controller 200 using various modules included in the first display device 201, and may transmit the analyzed result to the second display device 202 through the network. Thereafter, the second display device 202 may perform an operation based on the received control signal.

That is, the user who controls the remote controller 200 paired with the first display device 201 may have the same effect as controlling the unpaired second display device, and a detailed description thereof will be given later with reference to the following embodiments to be described later.

Further, it is assumed that the remote controller 200 described below can perform all of UWB communication, Bluetooth communication, and NFC. Only the second display device 202 may operate differently according to whether the UWB communication is possible, according to whether the Bluetooth communication is possible, and according to whether the NFC is possible. A method for enabling the remote controller 200 to control the second display device 202 according to each of the above cases will hereinafter be described in detail. In addition, the television (TV) described in the drawings may refer to one type of display device.

Figure 3:
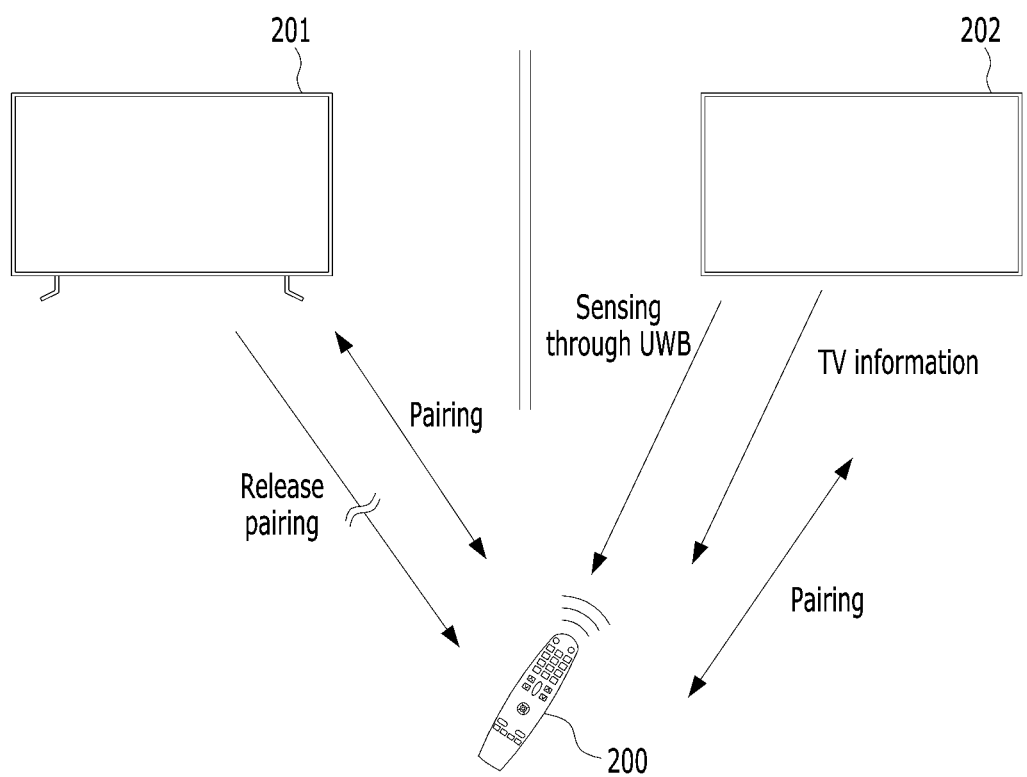
FIG. 3 is a conceptual diagram illustrating a method for controlling display devices by a remote controller according to an embodiment of the present disclosure.

FIG. 3 is a conceptual diagram illustrating a method for controlling display devices by a remote controller according to an embodiment of the present disclosure. Hereinafter, descriptions overlapping with the above description will herein be omitted for brevity.

It is assumed that the first display device 201 and the second display device 202 are spaced apart from each other by a predetermined distance or more. For example, it is assumed that the first display device 201 is located in a living room and the second display device 202 is located in a bedroom.

Referring to FIG. 3, it is assumed that the first display device 201 includes the UWB module and the Bluetooth module, and the second display device 202 also includes the UWB module and the Bluetooth module.

That is, both the first display device 201 and the second display device 202 may perform UWB communication and Bluetooth communication.

In this case, the first display device 201 and the remote controller 200 may perform pairing through Bluetooth communication.

In one embodiment, the second display device 202 may detect the remote controller 200 through the UWB module. When the second display device 202 detects the remote controller 200, information of the second display device 202 can be transmitted to the remote controller 200. In another embodiment, when the second display device 202 receives the control signal from the remote controller 200, the second display device 202 can detect the remote controller 200. For example, the user may press any button generating a signal toward the second display device 202 through the remote controller 200. Here, the information of the second display device 202 may include network information, Bluetooth support information, and information for supporting the remote controller 200. At this time, since the second display device 202 includes the UWB module and the Bluetooth module, the second display device 202 can directly communicate with the remote controller 200.

Accordingly, as the remote controller 200 receives information of the second display device 202 from the second display device 202, the remote controller 200 may release pairing with the first display device 201 so as to perform pairing with the second display device 202. That is, the remote controller 200 may perform unpairing with the first display device 201 so as to perform pairing with the second display device 202. In this case, the remote controller 200 may determine which one of the first display device 201 and the second display device 202 is to be used for pairing or unpairing based on the distance to the first display device 201 and the other distance to the second display device 202. Here, the unpairing may be the same as the operation of releasing pairing.

Thereafter, the remote controller 200 may pair with the second display device 202 and may directly control the second display device 202. To this end, the remote controller 200 may request pairing from the second display device 202, and the second display device 202 may respond to the pairing request.

While the remote controller 200 is performing pairing with the second display device 202, an IR signal may be generated from the remote controller 200. Here, the IR signal is a signal generated through the IR module of the remote controller 200. Since the IR signal is irrelevant to Bluetooth communication, both the first display device 201 and the second display device 202 can receive the IR signal.

In an embodiment, when the UWB module of the first display device 201 detects the remote controller 200, the second display device 202 may block IR reception. On the other hand, when the UWB module of the second display device 202 detects the remote controller 200, the first display device 201 may block IR reception.

The UWB module of the display device can recognize whether the remote controller 200 is located near the display device. Thus, when the remote controller 200 is located near the first display device 201, the second display device 202 blocks IR reception, so that the second display device 202 may be unaffected even if the user accidentally transmits the IR signal (e.g., IR signal corresponding to the power button).

Figure 4:
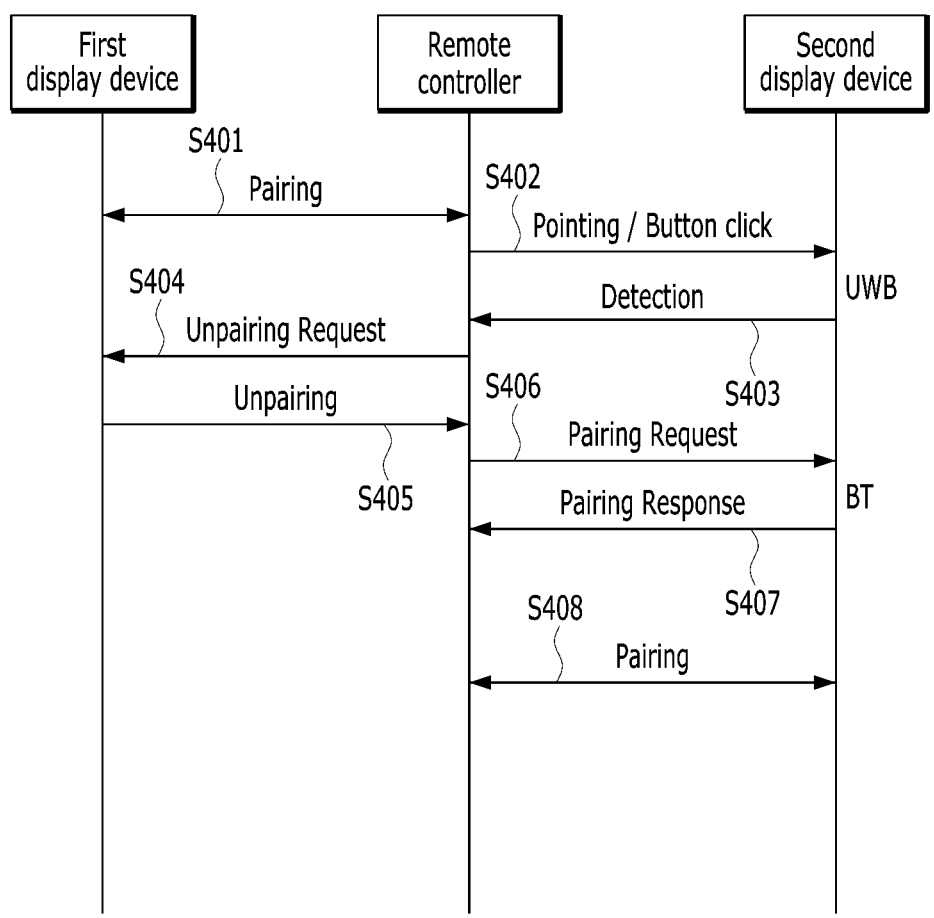
FIG. 4 is a sequence diagram illustrating the embodiment of FIG. 3.

FIG. 4 is a sequence diagram illustrating the embodiment of FIG. 3. Hereinafter, descriptions overlapping with the above description will herein be omitted for brevity.

Referring to FIG. 4, in step S401, the first display device may pair with the remote controller.

In step S401, the remote controller may transmit a control signal toward the second display device. In this case, the control signal may be transmitted by the user who presses (or performs pointing of) any button included in the remote controller.

In step S403, the second display device may detect the remote controller through the UWB module. Thereafter, the second display device may transmit network information, Bluetooth support information, remote-controller support information, etc. to the remote controller.

In step S404, when it is confirmed that the second display device supports Bluetooth communication, the remote controller may request unpairing from the first display device. Accordingly, in step S405, the first display device may perform unpairing with the remote controller.

In step S406, the remote controller unpaired with the first display device may request pairing from the second display device.

In step S407, the second display device may transmit a response to the requested pairing to the remote controller. In step S408, the second display device may pair with the remote controller.

Figure 5:
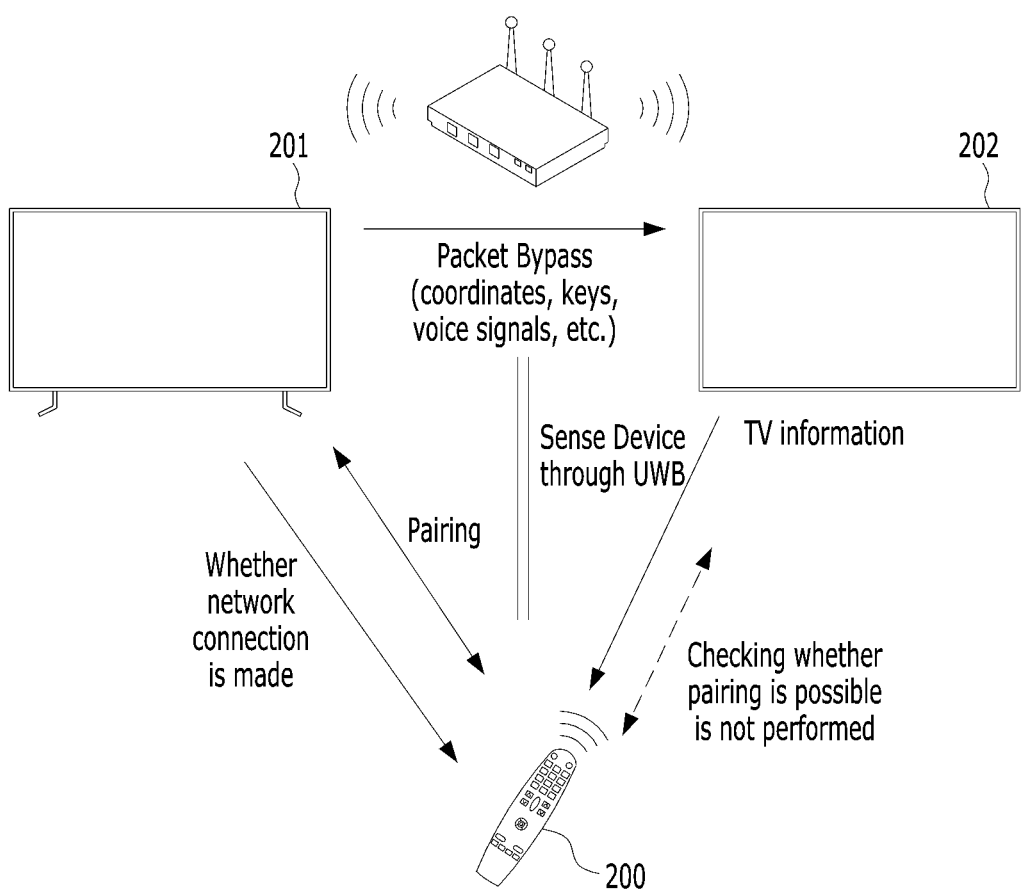
FIG. 5 is a conceptual diagram illustrating a method for controlling display devices by a remote controller according to another embodiment of the present disclosure.

FIG. 5 is a conceptual diagram illustrating a method for controlling display devices by the remote controller according to another embodiment of the present disclosure. Hereinafter, descriptions overlapping with the above description will herein be omitted for brevity.

As in the embodiment of FIG. 3, it is assumed that the first display device 201 and the second display device 202 are spaced apart from each other by a predetermined distance or more. For example, it is assumed that the first display device 201 is located in a living room and the second display device 202 is located in a bedroom.

Referring to FIG. 5, it is assumed that the first display device 201 includes the UWB module and the Bluetooth module, and the second display device 202 includes only the UWB module other than the Bluetooth module. In addition, the first display device 201 may pair with the remote controller 200.

In one embodiment, the second display device 202 may detect the remote controller 200 through the UWB module. In one embodiment, the second display device 202 may detect the remote controller 200 through the UWB module. When the second display device 202 detects the remote controller 200, information of the second display device 202 can be transmitted to the remote controller 200.

In this case, the second display device 202 may transmit information indicating the absence of the Bluetooth module to the remote controller 200. Accordingly, the second display device 202 and the remote controller 200 may not confirm whether pairing is possible.

In one embodiment, the first display device 201 may transmit network connectivity information to the remote controller 200. In more detail, the first display device 201 may transmit, to the remote controller, information indicating whether the first display device 201 is connected to the second display device 202 through the same network. For example, the above-described case may correspond to an exemplary case in which the first display device 201 and the second display device 202 use the same Wi-Fi network. If the first display device 201 and the second display device 202 are not connected to the same network, a guide window for requesting connection to the same network may be output, and a detailed description thereof will be given later with reference to FIG. 7.

In one embodiment, when the first display device 201 and the second display device 202 are connected to the same network, the remote controller 200 may control the second display device 202 through a control signal for the first display device 201.

In more detail, the first display device 201 may transmit a control signal received from the remote controller 200 to the second display device 202. For example, the first display device 201 may transmit coordinates, keys, voice signals, etc. received from the remote controller to the second display device 202 through a packet-connected network.

In the relationship between the first display device 201 and the remote controller 200, the first display device 201 may output a cursor based on a control signal of the remote controller 200 using (x, y) coordinates of a domain suitable for the resolution of the first display device 201. In this case, since the first display device 201 and the remote controller 200 operate in relative coordinates, the first display device 201 may set coordinates thereof based on the movement of the remote controller 200. Accordingly, the first display device 201 may transmit the control signal received from the remote controller 200 to the second display device 202 through the network. This is the same as described above in FIG. 2.

Accordingly, in practice, the first display device 201 receives the control signal of the remote controller 200, outputs a cursor by transmitting the control signal to the second display device 202, and inputs a control command, but the user may have the same effect as directly controlling the second display device 202 through the remote controller 200.

Also, in one embodiment, when the remote controller 200 is controlling the second display device 202 through the first display device 201, the first display device 201 may provide a standby- or AR-mode in which the network function can be used by the first display device 201 even if the first display device 201 is turned off through the IR signal (i.e., the power button) of the remote controller 200.

Figure 6:
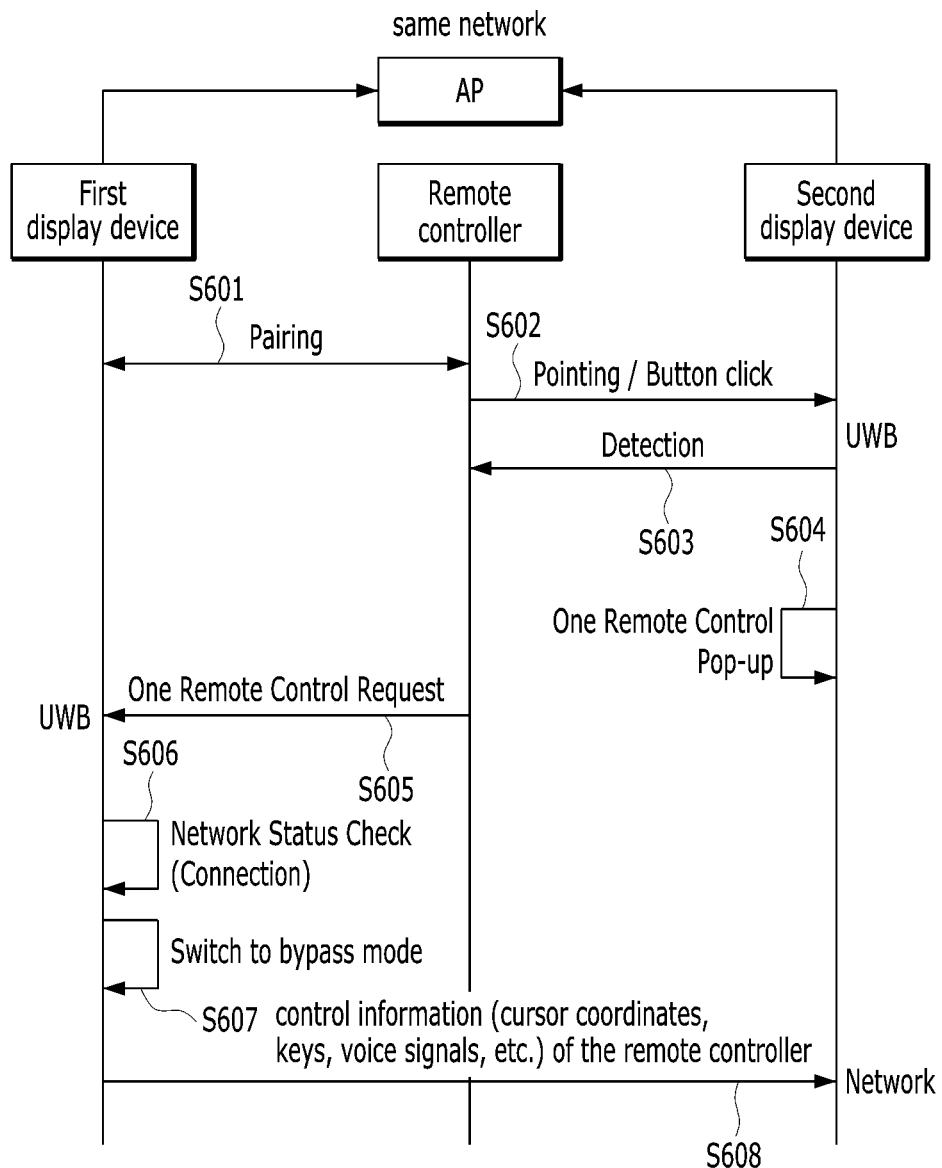
FIG. 6 is a sequence diagram illustrating the embodiment of FIG. 5.

FIG. 6 is a sequence diagram illustrating the embodiment of FIG. 5. Hereinafter, descriptions overlapping with the above description will herein be omitted for brevity.

Referring to FIG. 6, in step S601, the first display device may pair with the remote controller.

In step S602, the remote controller may transmit a control signal toward the second display device. In this case, the control signal may be transmitted by the user who presses (or performs pointing of) any button included in the remote controller.

In step S603, the second display device may detect the remote controller through the UWB module. Thereafter, the second display device may transmit network information, Bluetooth support information, remote-controller support information, etc. to the remote controller. At this time, the second display device may transmit, to the remote controller, information indicating that the Bluetooth function is not supported.

In step S604, the second display device may output a guide window that describes one remote controller capable of controlling the plurality of display devices, and a detailed description thereof will be given later with reference to FIG. 7.

In step S605, the remote controller implemented as only one remote controller may transmit a request signal for controlling the second display device to the first display device.

In step S606, the first display device may check a network connection state. More specifically, the first display device may check whether the first display device and the second display device use the same network (the same access point).

When the first display device and the second display device use the same network in step S606, the first display device may switch to the bypass mode in step S607. In this case, the bypass mode may refer to an operation mode in which the first display device ignores the control signal received from the remote controller and transmits the control signal to the second display device in step S608.

In step S608, the first display device may transmit control information (e.g., coordinates of a cursor, a key, a voice signal, etc.) to the second display device through the network.

Figure 7:
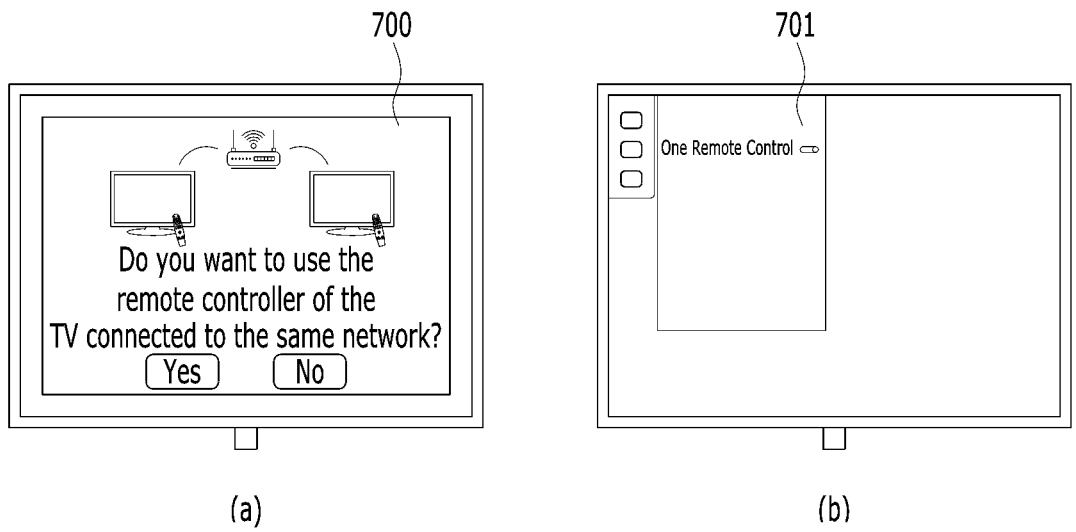
FIG. 7 is a diagram illustrating an embodiment in which a guide window for network connection is output to the display devices according to an embodiment of the present disclosure.

FIG. 7 is a diagram illustrating an embodiment in which a guide window for network connection is output to the display devices according to an embodiment of the present disclosure. Hereinafter, descriptions overlapping with the above description will herein be omitted for brevity.

In particular, FIG. 7(a) may assume that the first display device and the second display device are not connected to the same network. Referring to FIG. 7(a), the display device may output a guide window 700 for network connection. In this case, the guide window 700 may be output from a display device that is not connected to a network.

Here, the guide window 700 may include content inquiring whether to control the corresponding display device using the remote controller of the display device connected to the same network. In one embodiment, upon receiving a "Yes" signal from the user, the first display device or the second display device may connect to the network.

Referring to FIG. 7(b), the first display device or the second display device may receive in advance setting information for controlling another display device using one remote controller through a setting menu 701. The display device may output "one remote control" function among the existing setting menus. In an embodiment, when one remote control menu is activated, the display device may automatically connect to the network. In addition, when there is another display device connected to the same network, the display device may be controlled based on a control signal of the remote controller for controlling the other display device.

Figure 8:
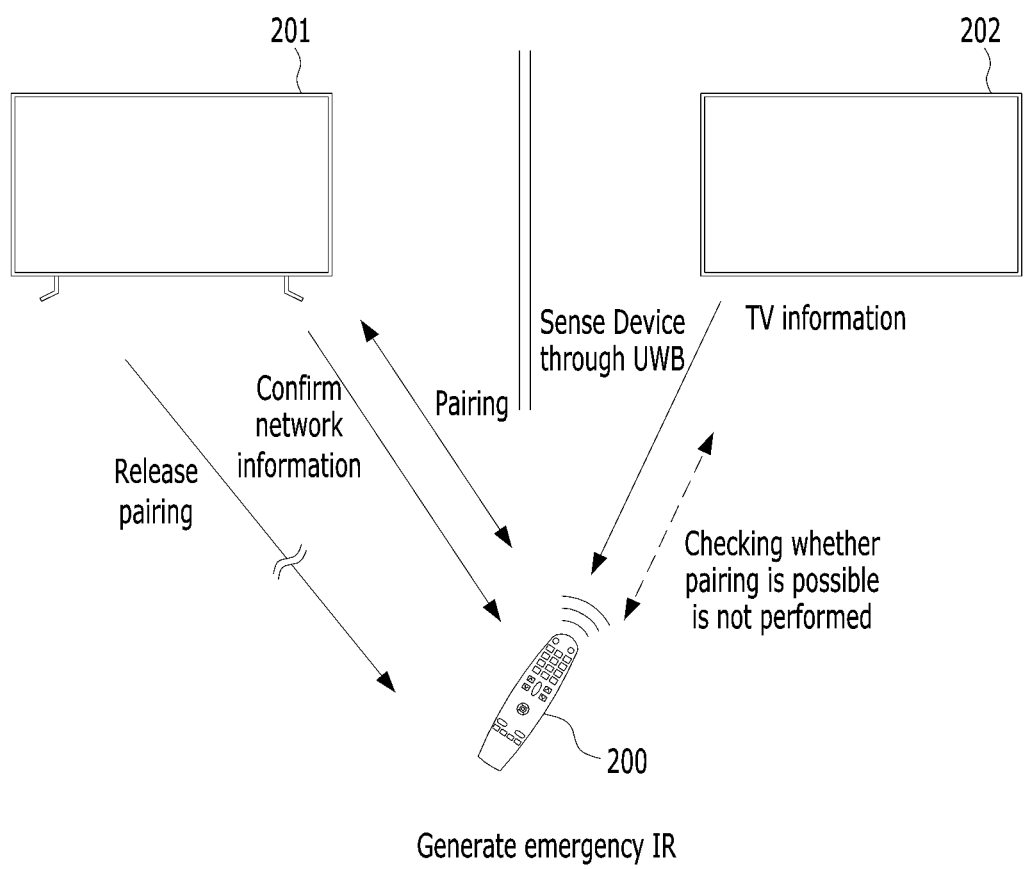
FIG. 8 is a conceptual diagram illustrating a method for controlling display devices by a remote controller according to another embodiment of the present disclosure.

FIG. 8 is a conceptual diagram illustrating a method for controlling display devices by a remote controller according to another embodiment of the present disclosure. Hereinafter, descriptions overlapping with the above description will herein be omitted for brevity.

Unlike FIG. 5, the embodiment of FIG. 8 assumes that the first display device 201 and the second display device 202 are not connected to the same network.

Referring to FIG. 8, the first display device 201 may pair with the remote controller 200. Thereafter, when the second display device 202 detects the remote controller 200 through the UWB module, the second display device 202 may transmit information of the second display device 202 to the remote controller 200. At this time, the information of the second display device 202 may indicate that the second display device 202 does not provide the Bluetooth function and is not connected to the network.

In one embodiment, the first display device 201 may inform the remote controller 200 of information indicating that the first display device 201 is not connected to the network.

That is, it can be confirmed that at least one of the first display device 201 and the second display device 202 is not connected to the network or the first display device 201 and the second display device 202 are not connected to the same network.

Accordingly, the first display device 201 and the remote controller 200 may perform unpairing. In an embodiment, the remote controller 200 may control the second display device 202 using the IR module. That is, since the only means for controlling the second display device 202 is the IR signal, the remote controller 200 may unpair with the first display device 201 and may control the second display device 202 using the IR signal.

Figure 9:
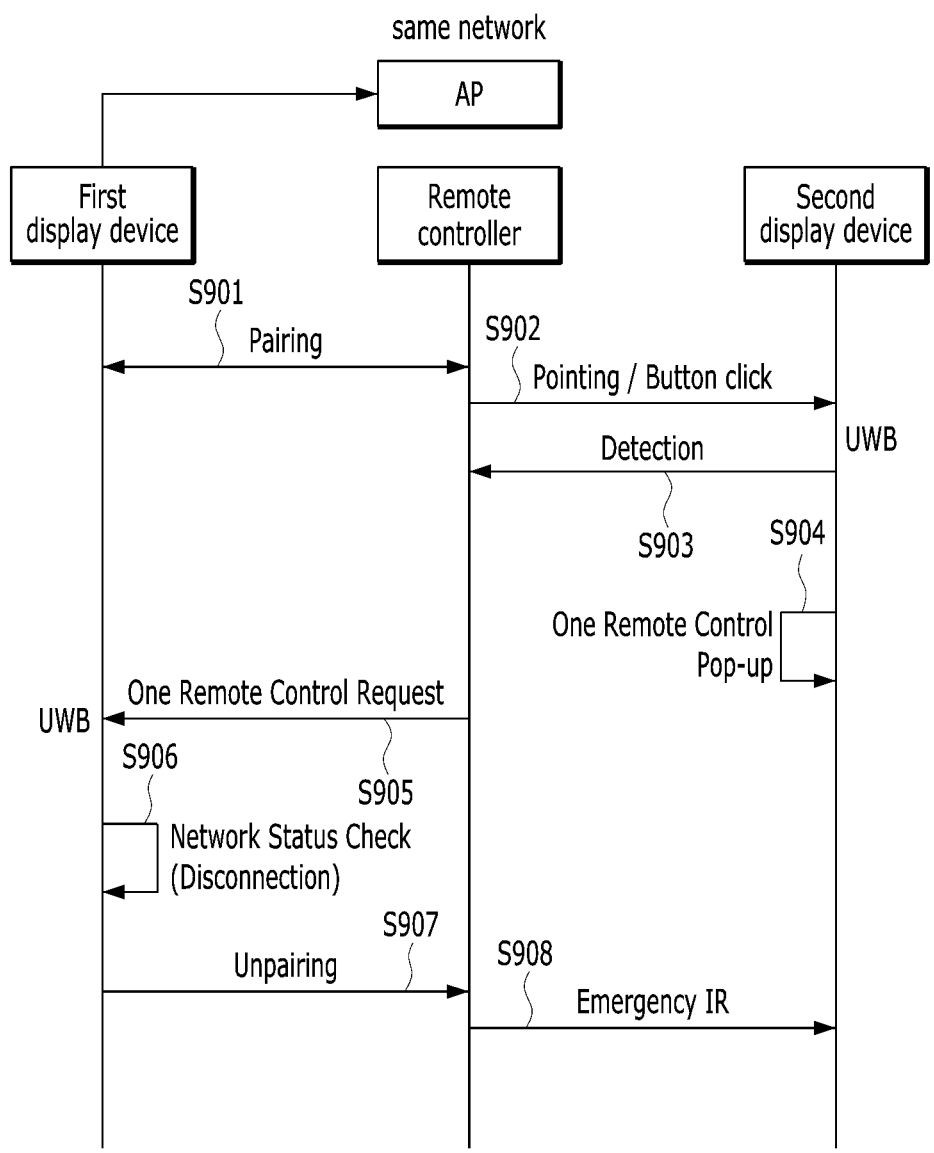
FIG. 9 is a sequence diagram illustrating the embodiment of FIG. 8.

FIG. 9 is a sequence diagram illustrating the embodiment of FIG. 8. Hereinafter, descriptions overlapping with the above description will herein be omitted for brevity.

Referring to FIG. 9, in step S901, the first display device may pair with the first display device.

In step S902, the remote controller may transmit a control signal to the second display device.

In step S903, the second display device may detect the remote controller through the UWB module. Thereafter, the second display device may transmit network information, Bluetooth support information, remote-controller support information, etc. to the remote controller. In this case, the second display device may not provide the Bluetooth function to the remote controller, and may inform the remote controller of information indicating that the second display device is not connected to the network.

In step S904, the second display device may output the guide window as shown in FIG. 7(a) or 7(b). More specifically, the second display device may request the user to connect to the same network as the first display device or may request the user to share the remote controller through the "one remote control" function.

Accordingly, in step S905, the remote controller may request one remote control from the first display device. In more detail, the remote controller may request the first display device to use another display device using only one remote controller.

In step S906, the first display device may check the network state. In the embodiment of FIG. 9, it can be confirmed that the first display device is not connected to the same network as the second display device.

In step S907, the first display device may be unpaired with the remote controller.

In step S908, the remote controller may control the second display device using the IR signal.

Figure 10:
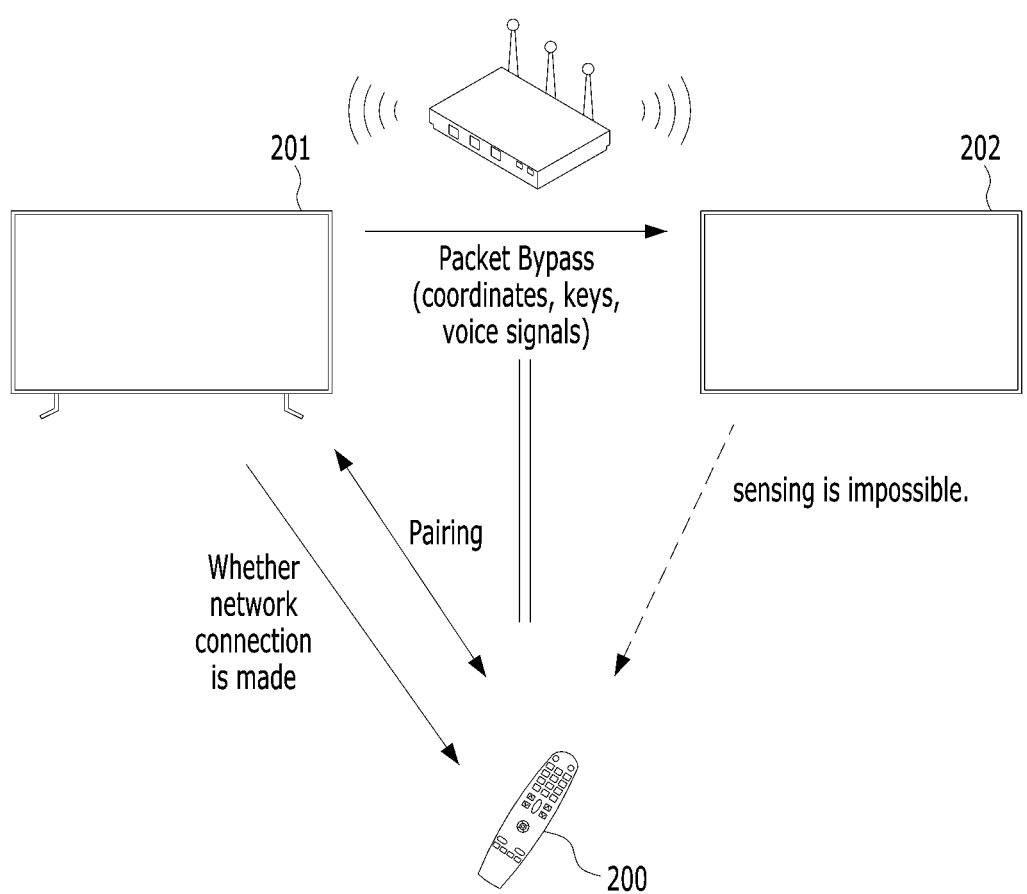
FIG. 10 is a conceptual diagram illustrating a method for controlling display devices by a remote controller according to another embodiment of the present disclosure.

FIG. 10 is a conceptual diagram illustrating a method for controlling display devices by the remote controller according to another embodiment of the present disclosure. Hereinafter, descriptions overlapping with the above description will herein be omitted for brevity.

Unlike the above-described embodiment, the embodiment of FIG. 10 assumes that the second display device 202 does not include the UWB module and the Bluetooth module.

Referring to FIG. 10, the first display device 201 may pair with the remote controller 200. At this time, since the second display device 202 does not include the UWB module, the second display device 202 cannot detect the remote controller 200. Accordingly, the first display device 201 can check whether the first display device 201 and the second display device 202 are connected to the same network.

Thereafter, the first display device 201 may inform the remote controller 200 that the first display device 201 and the second display device 202 are connected to the same network.

When the first display device 201 and the second display device 202 are connected to the same network, the remote controller 200 can control the second display device 202 through a control signal for the first display device 201 as shown in FIG. 5.

Figure 11:
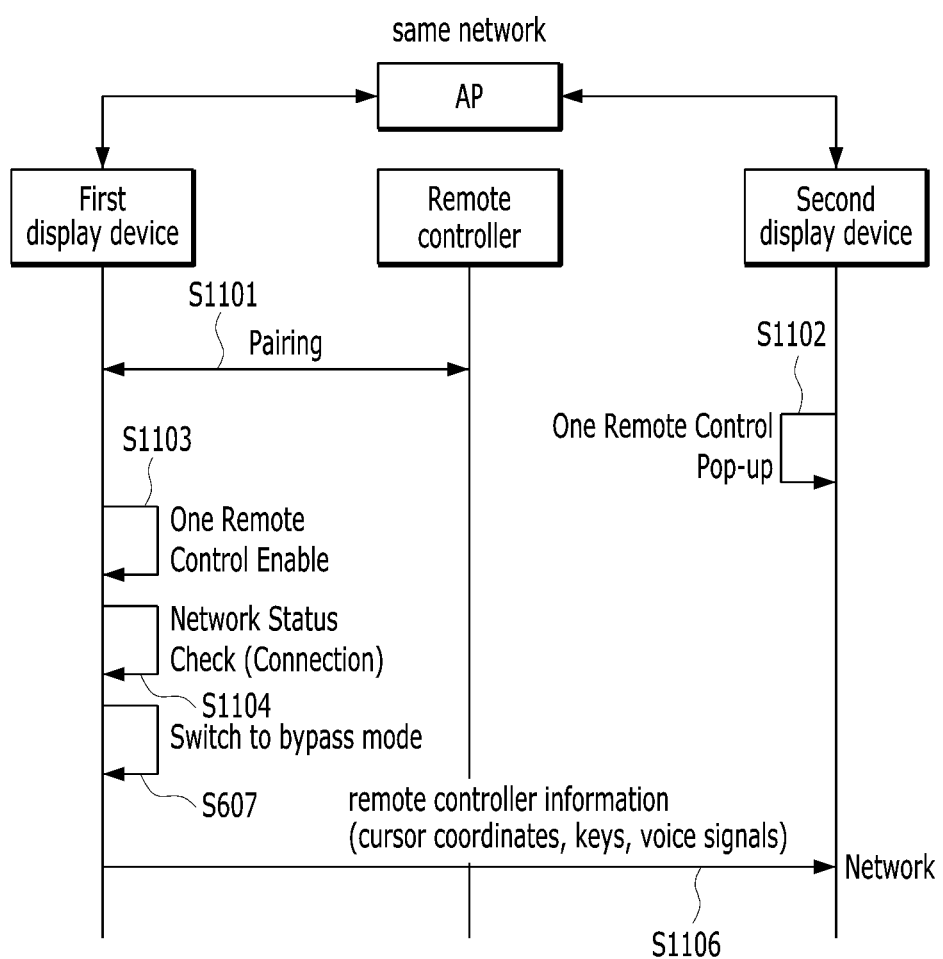
FIG. 11 is a sequence diagram illustrating the embodiment of FIG. 10.

FIG. 11 is a sequence diagram illustrating the embodiment of FIG. 10. Hereinafter, descriptions overlapping with the above description will herein be omitted for brevity.

Referring to FIG. 11, in step S1101, the first display device and the remote controller may pair with each other.

Since the second display device does not have a module capable of detecting the remote controller, the guide window as shown in FIG. 7(a) or 7(b) can be output in step S1102.

More specifically, the second display device may request the user to connect to the same network as the first display device, or may request the user to share the remote controller through the "one remote control" function. In this case, the embodiment of FIG. 11 assumes that the first display device and the second display device are connected to the same network through the "one remote control" function.

In step S1103, the first display device may activate the "one remote control" function. At the same time, in step S1104, the first display device can check the network state. In the embodiment of FIG. 11, it can be confirmed that the first display device is connected to the same network as the second display device.

When the first display device and the second display device are using the same network in step S1104, the first display device may switch to the bypass mode in step S1105.

In step S1106, the first display device may transmit control information (e.g., coordinates of a cursor, a key, a voice signal, etc.) of the remote controller to the second display device through the network.

Figure 12:
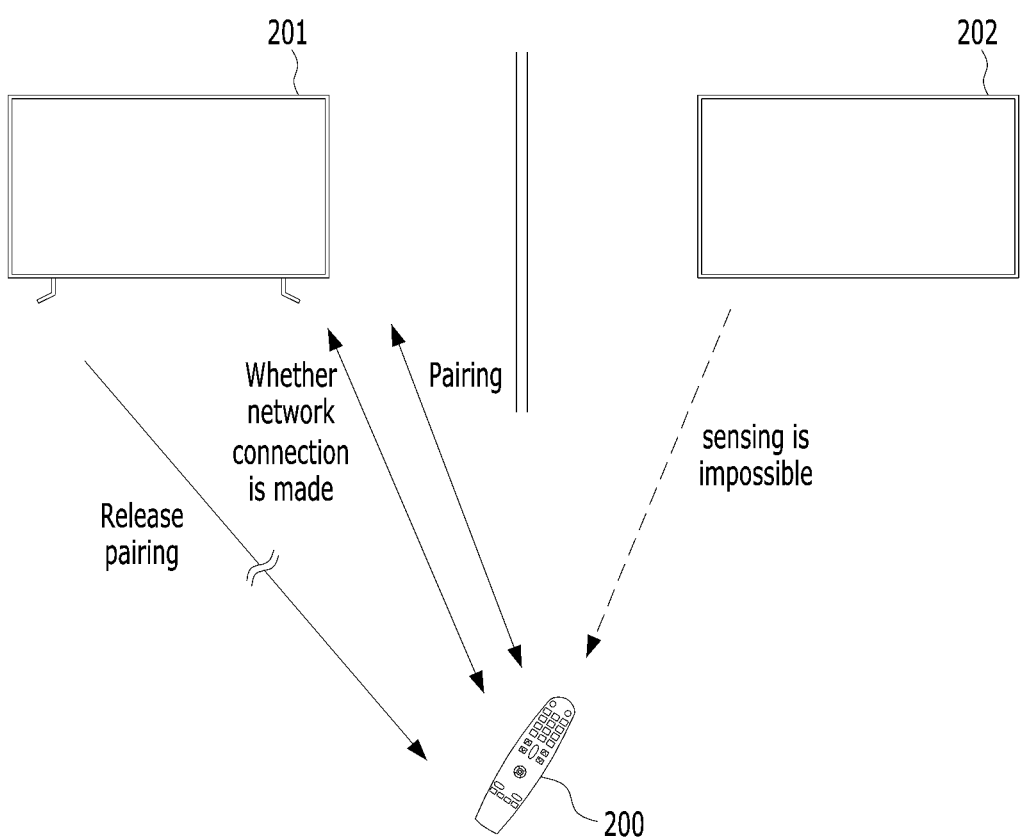
FIG. 12 is a conceptual diagram illustrating a method for controlling display devices by a remote controller according to another embodiment of the present disclosure.

FIG. 12 is a conceptual diagram illustrating a method for controlling display devices by a remote controller according to another embodiment of the present disclosure. Hereinafter, descriptions overlapping with the above description will herein be omitted for brevity.

Unlike FIG. 10, the embodiment of FIG. 12 assumes that the first display device 201 and the second display device 202 are not connected to the same network.

Referring to FIG. 12, the first display device 201 may pair with the remote controller 200. At this time, since the second display device 202 does not include the UWB module, the second display device 202 cannot detect the remote controller 200. Accordingly, the first display device 201 can check whether the first display device 201 and the second display device 202 are connected to the same network.

In an embodiment, the first display device 201 may inform the remote controller 200 that the first display device 201 is not connected to the network. That is, it can be confirmed that at least one of the first display device 201 and the second display device 202 is not connected to the network, or the first display device 201 and the second display device 202 are not connected to the same network.

Accordingly, the first display device 201 and the remote controller 200 may perform unpairing. In an embodiment, the remote controller 200 may control the second display device 202 using the IR module. That is, since the only means for controlling the second display device 202 is the IR signal, the remote controller 200 may unpair with the first display device 201 and may control the second display device 202 using the IR signal.

Figure 13:
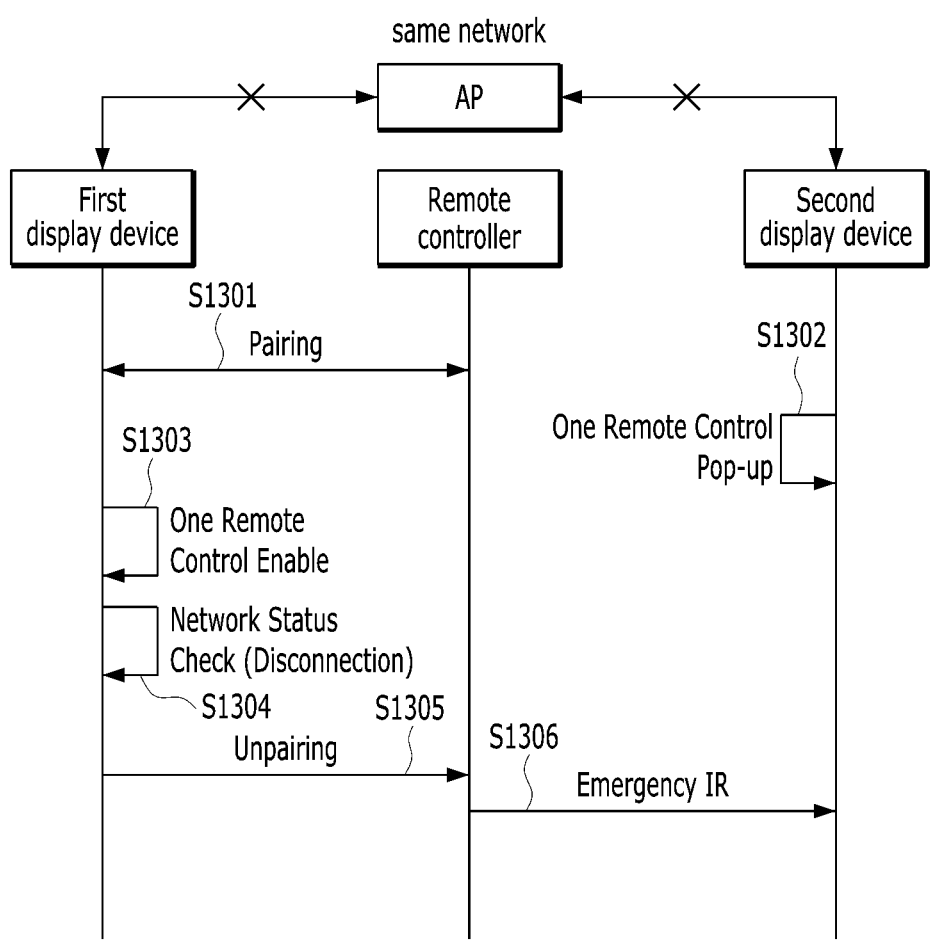
FIG. 13 is a sequence diagram illustrating the embodiment of FIG. 12.
Figure 14:
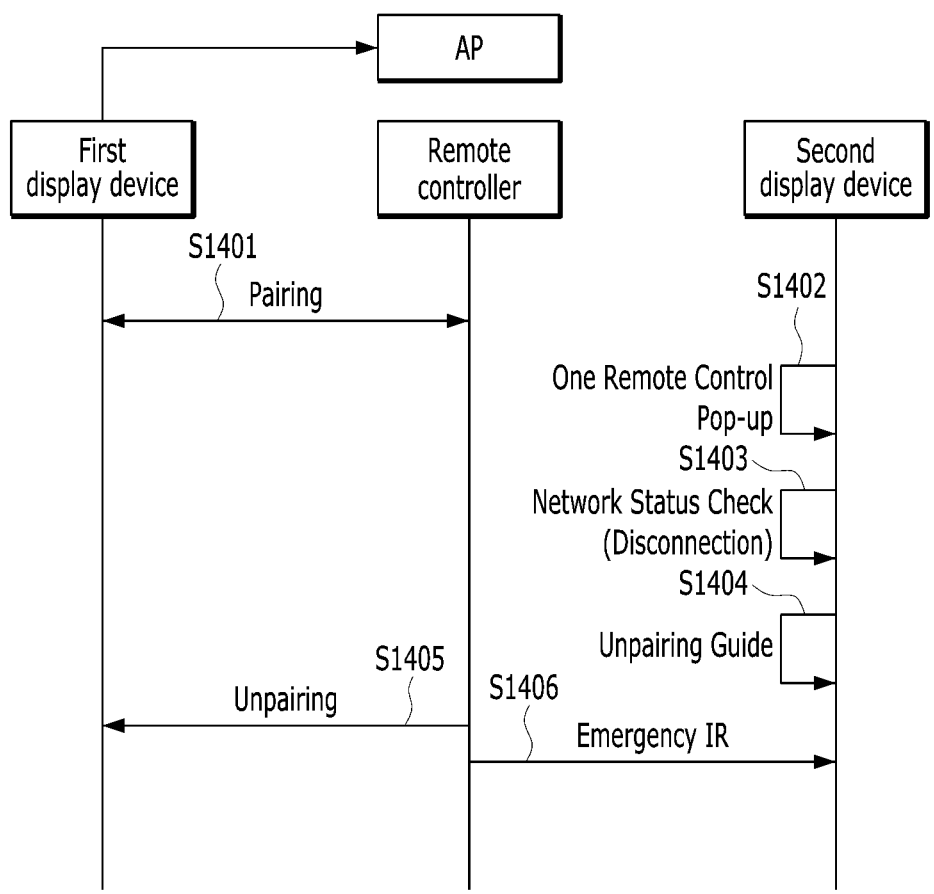
FIG. 14 is a sequence diagram illustrating another embodiment of FIG. 12.

In addition, in a situation where the first display device and the second display device are connected to the network, the embodiment of FIG. 13 indicates that at least one of the first display device and the second display device is not connected to the network, and the embodiment of FIG. 14 indicates that the second display device is not connected to the network.

FIG. 13 is a sequence diagram illustrating the embodiment of FIG. 12. Hereinafter, descriptions overlapping with the above description will herein be omitted for brevity.

Referring to FIG. 13, in step S1301, the first display device and the remote controller may pair with each other.

In one embodiment, in step S1302, since the second display device does not include a module capable of detecting the remote controller, the guide window can be output as shown in FIG. 7(a) or 7(b).

In step S1303, the first display device may activate the "one remote control" function. At the same time, the first display device may check the network state in step S1304. In the embodiment of FIG. 12, the first display device may confirm that at least one of the second display devices is disconnected from the network.

In step S1305, the first display device may perform unpairing with the remote controller. In step S1306, the remote controller may control the second display device using the IR signal.

That is, the embodiment of FIG. 13 indicates that network connection is severed while the first display device and the second display device are connected to the same network, the remote controller can recognize such network disconnection, so that the remote controller may release pairing with the first display device and then enter the IR mode.

FIG. 14 is a sequence diagram illustrating another embodiment of FIG. 12. Hereinafter, descriptions overlapping with the above description will herein be omitted for brevity.

Referring to FIG. 14, in step S1401, the first display device and the remote controller may pair with each other.

In step S1402, since the second display device does not include a module capable of detecting the remote controller, the guide window can be output as shown in FIG. 7(a) or 7(b).

In step S1403, the second display device may check the network state. Here, the second display device may confirm that the network is not connected.

In step S1404, the second display device may output, to the display screen, a window for guiding the user to perform unpairing with the first display device. In more detail, the second display device is not connected to the same network as the first display device, so that the second display device cannot receive a control signal from the first display device. In addition, the second display device cannot directly guide the remote controller to perform unpairing with the first display device. Accordingly, the second display device may request the user to perform unpairing between the remote controller and the first display device through the display screen.

Accordingly, in step S1405, the remote controller may request unpairing from the first display device. Thereafter, in step S1406, the remote controller may control the second display device using the IR signal.

Figure 15:
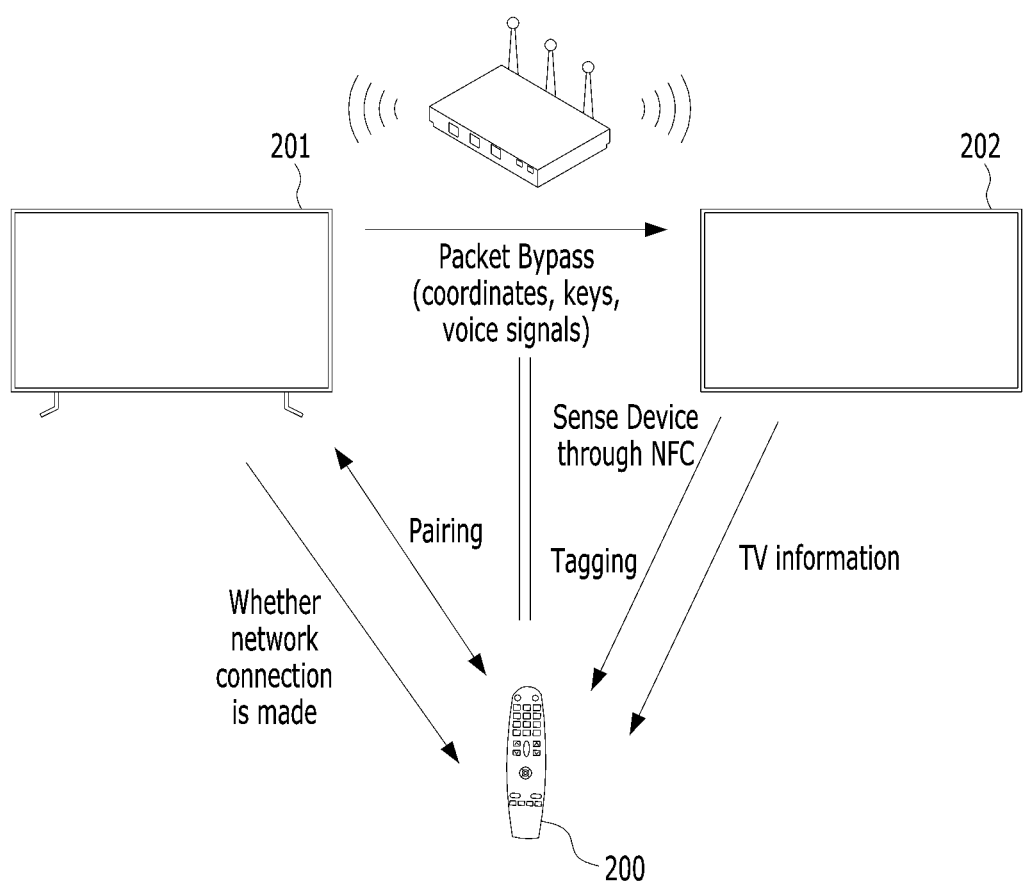
FIG. 15 is a conceptual diagram illustrating a method for controlling display devices by a remote controller according to another embodiment of the present disclosure.

FIG. 15 is a conceptual diagram illustrating a method for controlling display devices by the remote controller according to another embodiment of the present disclosure. Hereinafter, descriptions overlapping with the above description will herein be omitted for brevity.

In the embodiment of FIG. 15, it is assumed that the remote controller 200 includes an NFC tag and the second display device 202 includes an NFC tag receiver.

Referring to FIG. 15, the first display device 201 and the remote controller 200 may pair with each other. The user may tag the remote controller 200 to the NFC tag receiver of the second display device 202. For example, the second display device 202 may have the NFC tag receiver embedded in a back surface thereof.

Accordingly, the second display device 202 may detect the remote controller 200 and transmit information of the second display device 202 to the remote controller 200. At this time, the second display device 202 may inform the remote controller 200 of information indicating that the second display device 202 is connected to the network.

The first display device 201 may inform the remote controller 200 of whether a network is connected. Accordingly, the remote controller can recognize that the first display device 201 and the second display device 202 are connected to the same network.

Accordingly, the remote controller 200 may control the second display device 202 through a control signal for the first display device 201. This is as described above with reference to FIG. 5.

Figure 16:
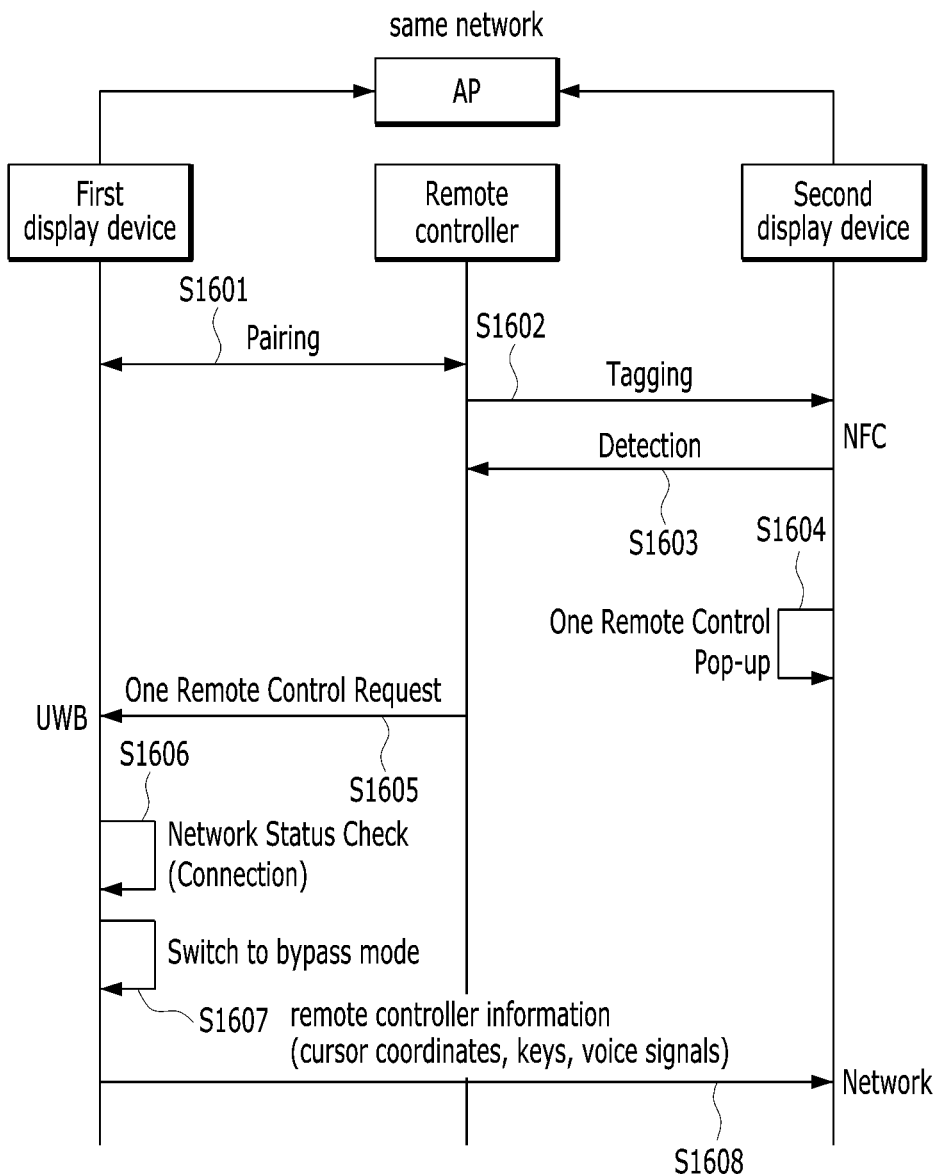
FIG. 16 is a sequence diagram illustrating the embodiment of FIG. 15.

FIG. 16 is a sequence diagram illustrating the embodiment of FIG. 15. Hereinafter, descriptions overlapping with the above description will herein be omitted for brevity.

Referring to FIG. 16, in step S1601, the first display device and the remote controller may pair with each other.

In step S1602, the remote controller may tag the NFC to the NFC tag receiver of the second display device.

In step S1603, the second display device may recognize the remote controller through the NFC tag receiver, and may transmit information about the second display device.

In step S1604, the second display device may output the "one remote control" guide window. This is as described above with reference to FIG. 7.

In step S1605, the remote controller may request one remote control from the first display device.

In step S1606, the first display device may check the network state. At this time, the first display device can confirm that the first display device and the second display device are connected to the same network.

When the first display device and the second display device are using the same network, the first display device can switch to the bypass mode in step S1607.

In step S1608, the first display device may transmit control information (e.g., coordinates of a cursor, a key, a voice signal, etc.) to the second display device through the network.

Figure 17:
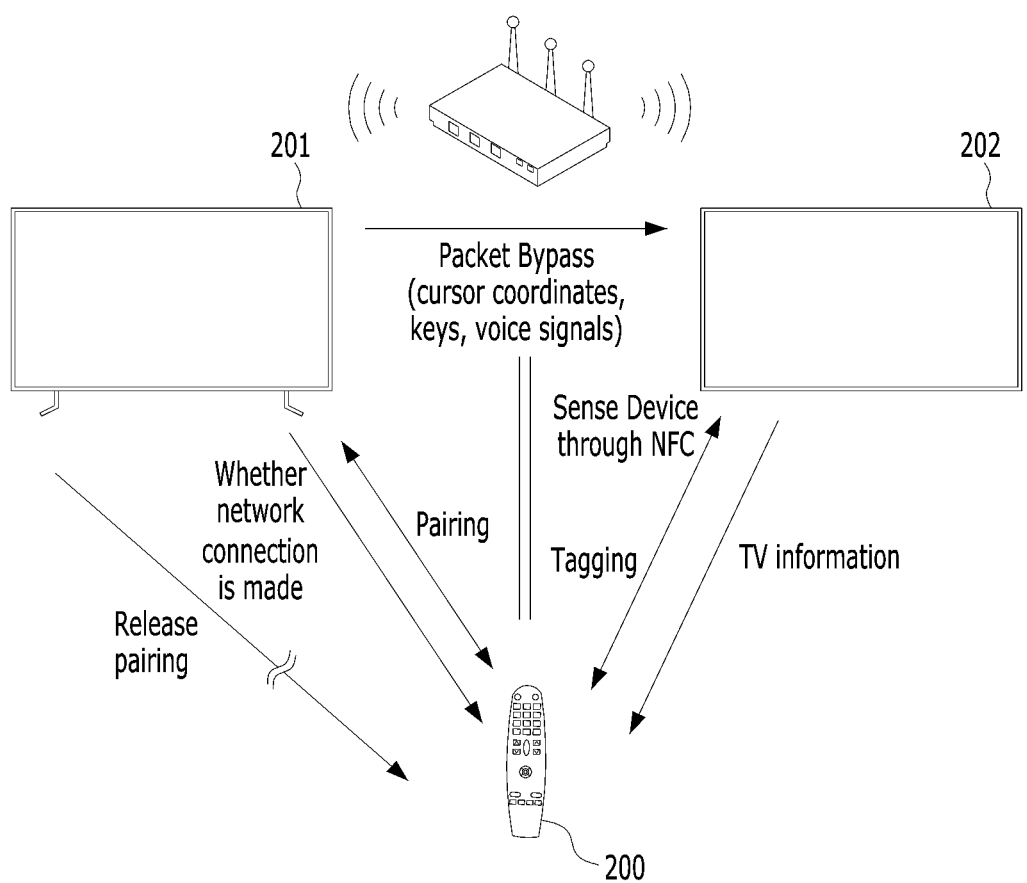
FIG. 17 is a conceptual diagram illustrating a method for controlling display devices by a remote controller according to another embodiment of the present disclosure.

FIG. 17 is a conceptual diagram illustrating a method for controlling display devices by the remote controller according to another embodiment of the present disclosure. Hereinafter, descriptions overlapping with the above description will herein be omitted for brevity.

Unlike FIG. 15, the embodiment of FIG. 17 assumes that the first display device 201 and the second display device 202 are not connected to the same network.

Referring to FIG. 17, the first display device 201 and the remote controller 200 may pair with each other. The user may tag the remote controller 200 to the NFC tag receiver of the second display device 202.

Accordingly, the second display device 202 may detect the remote controller 200 and transmit information of the second display device 202 to the remote controller 200. At this time, the second display device 202 may indicate that the second display device 202 is not connected to the network.

The first display device 201 may also inform the remote controller 200 of whether a network is connected. Thereafter, the first display device 201 may release pairing with the remote controller.

The remote controller 200 unpaired with the first display device 201 may control the second display device 202 using the IR signal.

Figure 18:
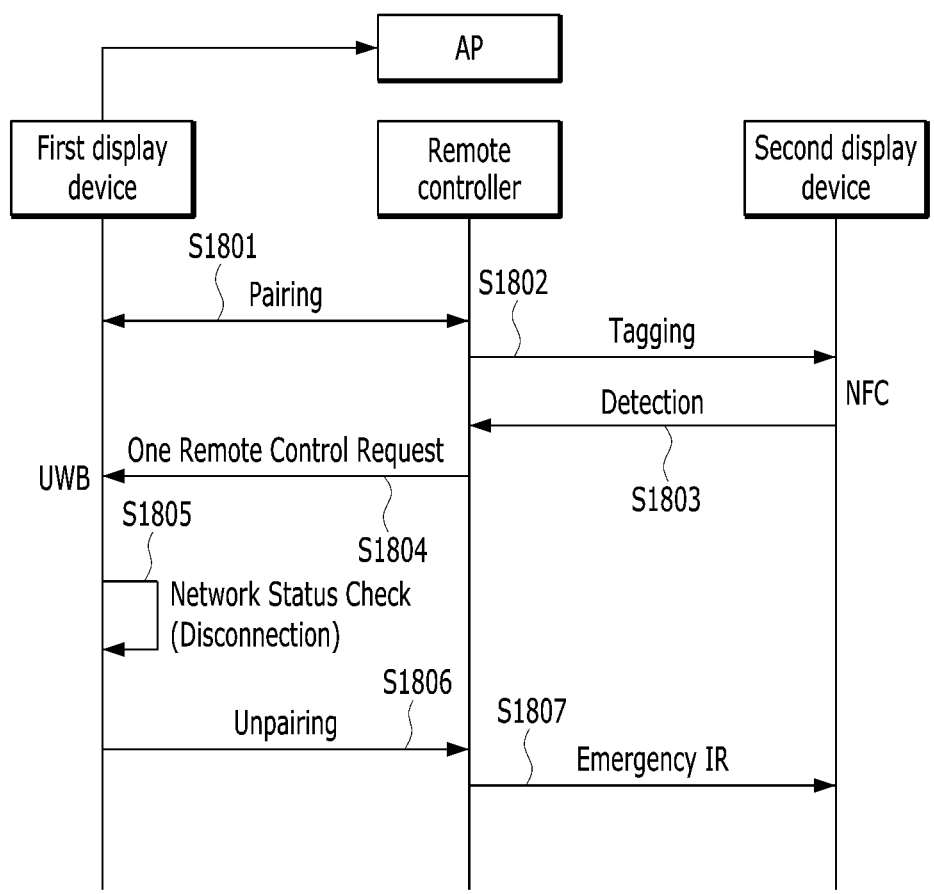
FIG. 18 is a sequence diagram illustrating the embodiment of FIG. 17.

FIG. 18 is a sequence diagram illustrating the embodiment of FIG. 17.

Hereinafter, descriptions overlapping with the above description will herein be omitted for brevity.

Referring to FIG. 18, in step S1801, the first display device and the remote controller may pair with each other.

In step S1802, the remote controller may tag the NFC to the NFC tag receiver of the second display device.

In step S1803, the second display device may recognize the remote controller through the NFC tag receiver, and may transmit information for the second display device. At this time, the second display device may inform the remote controller that the second display device is not connected to the network.

In step S1804, the remote controller may request one remote control from the first display device.

In step S1805, the first display device may check the network state. At this time, the first display device may confirm that the first display device and the second display device are not connected to the same network.

In step S1806, the first display device may perform unpairing with the remote controller.

In step S1807, the remote controller may control the second display device using the IR signal.

According to the above-described embodiments, several display devices can be controlled by only one remote controller. That is, the above-described embodiments have advantages in that the remote controller need not be paired separately for each display device. In addition, according to the above-described embodiments, the magic remote control function can be used in a display device not supporting the magic remote control function of the remote controller.

The present disclosure may be implemented as code that can be written to a computer-readable recording medium and can thus be read by a computer. The computer-readable recording medium may be any type of recording device in which data can be stored in a computer-readable manner. Examples of the computer-readable recording medium include a hard disk drive (HDD), a solid state drive (SSD), a silicon disk drive (SDD), a ROM, a RAM, a CD-ROM, a magnetic tape, a floppy disk, optical data storage, and a carrier wave (e.g., data transmission over the Internet). In addition, the computer may include the controller. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

As is apparent from the above description, the embodiments of the present disclosure can control a plurality of display devices using only one remote controller.

In addition, the embodiments of the present disclosure can control at least one display device which does not provide a Bluetooth function or is not connected to a network.

It will be apparent to those skilled in the art that various modifications and variations can be made in the present disclosure without departing from the spirit or scope of the inventions. Thus, it is intended that the present disclosure covers the modifications and variations of this invention provided they come within the scope of the appended claims and their equivalents.

What is claimed is:

1. A display device control system comprising:
a first display device configured to include a first ultra-wideband (UWB) module and a first Bluetooth module;
a second display device; and
a remote controller configured to include an infrared (IR) module, a second UWB module, and a second Bluetooth module,
wherein the first display device and the remote controller are paired with each other,
wherein when the second display device includes a third UWB module and a third Bluetooth module, the third UWB module of the second display device senses the remote controller, the first display device and the remote controller are unpaired with each other, and the second display device and the remote controller are paired with each other,
wherein the remote controller receives information of the second display device through the second UWB module, and
wherein the information of the second display device includes network information of the second display device, Bluetooth support information of the second display device, and support information of the remote controller.

2. The display device control system according to claim 1, wherein:
when the first UWB module of the first display device senses the remote controller, the second display device blocks infrared (IR) reception; and
when the third UWB module of the second display device senses the remote controller, the first display device blocks IR reception.

3. The display device control system according to claim 1, wherein:
when the second display device includes the third UWB module and does not include the third Bluetooth module, the third UWB module of the second display device senses the remote controller;
confirming whether the first display device and the second display device are connected to the same network is performed; and
when the first display device and the second display device are connected to the same network, the remote controller controls the second display device through a control signal for the first display device.

4. The display device control system according to claim 3, wherein:
the first display device transmits a control signal received from the remote controller to the second display device.

5. The display device control system according to claim 3, wherein:
when the first display device and the second display device are not connected to the same network, a guide window for connecting at least one of the first display device and the second display device to a network is output.

6. The display device control system according to claim 3, wherein:
when the second display device is not connected to a network, the first display device and the remote controller are unpaired with each other; and
the second display device is controlled using the IR module of the remote controller.

7. The display device control system according to claim 1, wherein:
when the second display device does not include the third UWB module and the third Bluetooth module, confirming whether the first display device and the second display device are connected to the same network is performed; and
when the first display device and the second display device are connected to the same network, the remote controller controls the second display device through a control signal for the first display device.

8. The display device control system according to claim 7, wherein:

when at least one of the first display device and the second display device is not connected to a network, the first display device and the remote controller are unpaired with each other; and the second display device is controlled using the IR module of the remote controller.

9. The display device control system according to claim 1, wherein:

the remote controller further includes a near field communication (NFC) tag;

when the second display device includes an NFC tag receiver, the NFC tag receiver of the second display device senses the remote controller;

confirming whether the first display device and the second display device are connected to the same network is performed; and when the first display device and the second display device are connected to the same network, the remote controller controls the second display device through a control signal for the first display device.

10. The display device control system according to claim 9, wherein:

when at least one of the first display device and the second display device is not connected to a network, the first display device and the remote controller are unpaired with each other; and the second display device is controlled using the IR module of the remote controller.

11. A remote controller comprising:

an infrared (IR) module;
an ultra-wideband (UWB) module;
a Bluetooth module;
a near field communication (NFC) tag; and
a controller,
wherein the controller is configured to:
perform pairing with a first display device;
perform unpairing with the first display device upon receiving information of a second display device from the second display device, wherein the information of the second display device includes network information and Bluetooth support information; and
perform pairing with the second display device,
wherein the controller is configured to:
receive network information from the first display device, when the second display device does not provide a Bluetooth function; and control the second display device through a control signal for the first display device, when the first display device and the second display device are connected to the same network.

12. The remote controller according to claim 11, wherein the controller is configured to:

perform unpairing with the first display device, when at least one of the first display device and the second display device is not connected to a network; and control the second display device using the IR module.

13. The remote controller according to claim 11, wherein:

the information of the second display device is received through an NFC tag receiver of the second display device.

14. A method for controlling the remote controller comprising:

performing pairing with the first display device;

performing unpairing with the first display device upon receiving information of the second display device from the second display device; and performing pairing with the second display device, wherein information of the second display device includes network information and Bluetooth support information, and wherein the method further comprises:

receiving network information from the first display device, when the second display device does not provide a Bluetooth function; and controlling the second display device through a control signal for the first display device, when the first display device and the second display device are connected to the same network.

15. The method according to claim 14, further comprising:

performing unpairing with the first display device, when at least one of the first display device and the second display device is not connected to a network; and controlling the second display device using the IR module.

16. The method according to claim 14, further comprising:

receiving information of the second display device through an NFC tag receiver of the second display device.

* * * * *